United States Patent
Nanahara et al.

(10) Patent No.: US 8,939,430 B2
(45) Date of Patent: Jan. 27, 2015

(54) ELECTROMAGNETIC LINEAR VALVE

(75) Inventors: Masaki Nanahara, Toyota (JP); Kei Sato, Kasugai (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 750 days.

(21) Appl. No.: 13/203,736

(22) PCT Filed: Dec. 21, 2009

(86) PCT No.: PCT/JP2009/071226
§ 371 (c)(1),
(2), (4) Date: Aug. 29, 2011

(87) PCT Pub. No.: WO2011/077506
PCT Pub. Date: Jun. 30, 2011

(65) Prior Publication Data
US 2012/0001109 A1  Jan. 5, 2012

(51) Int. Cl.
*F16K 31/06* (2006.01)
*B60T 8/36* (2006.01)
(Continued)

(52) U.S. Cl.
CPC .............. *F16K 31/0648* (2013.01); *B60T 8/367* (2013.01); *B60T 8/4081* (2013.01); *F16K 1/34* (2013.01); *F16K 31/0658* (2013.01)
USPC .................................................. 251/129.15

(58) Field of Classification Search
USPC ................. 251/129.15, 129.07; 335/261–264
See application file for complete search history.

(56) References Cited

U.S. PATENT DOCUMENTS 2,040,964 A * 5/1936 Tarleton ................... 251/129.15
4,509,716 A * 4/1985 Barber et al. ............. 251/129.14
(Continued)

FOREIGN PATENT DOCUMENTS

DE 10 2008 056 854 A1  5/2010
JP      6 20966         3/1994
(Continued)

OTHER PUBLICATIONS

International Search Report issued Jan. 26, 2010 in PCT/JP09/071226 filed Dec. 21, 2009.

*Primary Examiner* — John K Fristoe, Jr.
*Assistant Examiner* — Jonathan Waddy
(74) *Attorney, Agent, or Firm* — Oblon, Spivak, McClelland, Maier & Neustadt, L.L.P.

(57) ABSTRACT

An electromagnetic linear valve includes: (a) a plunger including a large outside-diameter portion and a small outside-diameter portion, and (b) a housing having a through-hole and including a large inside-diameter portion in which the large outside-diameter portion is inserted with a clearance being defined between the large inside-diameter portion and the large outside-diameter portion, and a small inside-diameter portion in which the small outside-diameter portion is inserted with a clearance being defined between the small inside-diameter portion and the outside-diameter portion. The plunger has an end portion which serves as a valve body that is to be seated on a valve seat constituted by an opening of the through-hole. The large outside-diameter portion has an end portion constituted by another end portion of the plunger that is opposite to the above-described end portion of the plunger. The clearance between the small inside-diameter portion and the small outside-diameter portion is smaller than the clearance between the large inside-diameter portion and the large outside-diameter portion.

13 Claims, 8 Drawing Sheets

(51) Int. Cl.
*B60T 8/40* (2006.01)
*F16K 1/34* (2006.01)

(56) References Cited

U.S. PATENT DOCUMENTS

| | | | |
|---|---|---|---|
| 5,423,602 A | 6/1995 | Takahashi | |
| 6,322,049 B1* | 11/2001 | Hofmann et al. | 251/129.15 |
| 6,837,478 B1* | 1/2005 | Goossens et al. | 251/129.15 |
| 2002/0145125 A1* | 10/2002 | Tomoda et al. | 251/129.15 |
| 2008/0185545 A1* | 8/2008 | Hirota | 251/129.15 |
| 2011/0215271 A1 | 9/2011 | Voss et al. | |

FOREIGN PATENT DOCUMENTS

| | | |
|---|---|---|
| JP | 2005 133926 | 5/2005 |
| JP | 2008 39157 | 2/2008 |
| JP | 2009 63024 | 3/2009 |

* cited by examiner

ELECTROMAGNETIC LINEAR VALVE

TECHNICAL FIELD

The present invention relates to an electromagnetic linear valve which has a housing and a plunger disposed movably in its axial direction in the housing, and which is to be opened and closed by movement of the plunger.

BACKGROUND ART

An electromagnetic linear valve has a plunger and a housing. The plunger includes an end portion serving as a valve body that is to be seated on a valve seat provided in the housing. In a state in which the valve body is seated on the valve seat, flow of a working fluid in a direction away from a working fluid passage of a high-pressure side toward a working fluid passage of a low-pressure side is inhibited. In a state in which the valve body is separated from the valve seat, the flow of the working fluid in the direction away from the working fluid passage of the high-pressure side toward the working fluid passage of the low-pressure side is allowed. The electromagnetic linear valve further has an elastic body and a coil. The elastic body is adapted to force the plunger in one of an approaching direction that causes the valve body to be forced toward the valve seat and a separating direction that causes the valve body to be forced away from the valve seat. The coil is configured to form a magnetic field for causing the plunger to be moved in the other of the approaching direction and the separating direction. By controlling an amount of electric current that is to be supplied to the coil, it is possible to controllably change a difference between a pressure (hereinafter referred to as "high-pressure-side working fluid pressure" where appropriate) of the working fluid in the working fluid passage of the high-pressure side and a pressure (hereinafter referred to as "low-pressure-side working fluid pressure" where appropriate) of the working fluid in the working fluid passage of the low-pressure side. The below-identified patent literature discloses a hydraulic brake system employing the electromagnetic linear valve that is constructed as described above. In this brake system, the pressure of the working fluid for activating a brake device, is controlled by controlling the electromagnetic linear valve.

[Patent Literature 1] JP-2008-39157A

DISCLOSURE OF THE INVENTION

(A) Outline of the Invention

In the electromagnetic linear valve constructed as described above, there is a risk that self-vibration could be caused upon opening and closing of the valve, since the plunger is supported by the elastic body in the housing. As a method for restraining the self-vibration of the plunger, there is a technique, as disclosed in the above-identified patent literature 1, for increasing a friction force generated between the plunger and an inner circumferential surface of the housing. It might be possible to restrain the self-vibration by increasing the friction force generated between the plunger and the housing. However, when the pressure difference between the high-pressure-side working fluid pressure and the low-pressure-side working fluid pressure is to be controlled, the force acting on the plunger is controlled by controlling the amount of electric current supplied to the coil. Therefore, if the friction force between the plunger and the housing is increased, there is a risk that the pressure difference between the high-pressure-side working fluid pressure and the low-pressure-side working fluid pressure could not be suitably controlled. The present invention was made in the light of the background art discussed above, and has an object of the invention to provide an electromagnetic linear valve which is capable of restraining self-vibration of the plunger without causing a large friction force to be generated between the plunger and the inner circumferential surface of the housing.

For achieving this object, an electromagnetic linear valve according to this invention includes: (a) a plunger having an end portion which serves as a valve body, and including a large outside-diameter portion and a small outside-diameter portion, so as to have a stepped shape, the large outside-diameter portion being made of a ferromagnetic material and having an end portion constituted by another end portion of the plunger that is opposite to the above-described end portion of the plunger, the small outside-diameter portion being made of a ferromagnetic material and being contiguous to the large outside-diameter portion; and (b) a housing including a large inside-diameter portion which is made of a ferromagnetic material and in which the large outside-diameter portion is inserted with a clearance being defined between the large inside-diameter portion and the large outside-diameter portion, and a small inside-diameter portion which is made of a ferromagnetic material and in which the small outside-diameter portion is inserted with a clearance being defined between the small inside-diameter portion and the outside-diameter portion, the small inside-diameter portion being contiguous to the large inside-diameter portion, wherein the clearance between the small inside-diameter portion and the small outside-diameter portion is smaller than the clearance between the large inside-diameter portion and the large outside-diameter portion.

For achieving this object, another electromagnetic linear valve according to this invention includes a plunger having an end portion which serves as a valve body, and including two flux-passing portions which are contiguous to each other in the axial direction, such that a magnetic flux is caused to flow in the axial direction upon formation of a magnetic field by a coil, wherein one of the two flux-passing portions is a first flux-passing portion including an end portion that is constituted by another end portion of the plunger that is opposite to the above-described end portion of the plunger, while the other of the two flux-passing portions is a second flux-passing portion that is located on a side of the end portion of the plunger, such that the magnetic flux can be caused to flow by a larger amount within the first flux-passing portion than within the second flux-passing portion, the electromagnetic linear valve being constructed such that, upon movement of the plunger within the housing, the second flux-passing portion and the housing are in sliding contact with each other, while the first flux-passing portion and the housing are spaced apart from each other by a clearance defined therebetween without the first flux-passing portion and the housing being in sliding contact with each other, the electromagnetic linear valve being constructed such that, upon flow of the magnetic flux through the first and second flux-passing portions, a part of the magnetic flux, which is disabled to flow to the second flux-passing portion as a result of magnetic saturation of the second flux-passing portion, is caused to flow between the first flux-passing portion and the housing via the clearance defined therebetween, while a part of the magnetic flux, which is allowed to flow to the second flux-passing portion, is caused to flow between the second flux-passing portion and the housing.

In a former one of the electromagnetic linear valves according to the invention, when the magnetic flux flows within the plunger upon formation of the magnetic field, magnetic saturation takes place in the small outside-diameter portion of the plunger since a cross sectional area of the plunger is changed abruptly at a boundary between the large outside-diameter portion and the small outside-diameter portion. In this instance, the magnetic flux flowing within the plunger is divided into a part flowing to the large outside-diameter portion and a part flowing to the small outside-diameter portion. Further, during movement of the plunger, the small outside-diameter portion and the small inside-diameter portion are in contact with each other without the large outside-diameter portion and the large inside-diameter portion being in contact with each other, due to a relationship between a clearance defined between the small outside-diameter portion and the small inside-diameter portion and a clearance defined between the large outside-diameter portion and the large inside-diameter portion. Therefore, an amount of the part of the magnetic flux flowing to contact portions at which the plunger and the inner circumferential surface of the housing are in contact with each other, is smaller than an amount of the entire magnetic flux flowing within the plunger.

Further, in a latter one of the electromagnetic linear valves according to the invention, when the magnetic flux flows within the plunger upon formation of the magnetic field, magnetic saturation takes place in the second flux-passing portion of the plunger since the second flux-passing portion of the plunger allows flow of the magnetic flux by a smaller amount therein than the first flux-passing portion of the plunger. In this instance, the magnetic flux flowing within the plunger is divided into a part flowing to the first flux-passing portion and a part flowing to the second flux-passing portion. Further, during movement of the plunger, the second flux-passing portion and the inner circumferential surface of the housing are in contact with each other without the first flux-passing portion and the inner circumferential surface of the housing being in contact with each other. Therefore, an amount of the part of the magnetic flux flowing to contact portions at which the plunger and the inner circumferential surface of the housing are in contact with each other, is smaller than an amount of the entire magnetic flux flowing within the plunger.

As described below in detail, the friction force generated between the plunger and the inner circumferential surface of the housing is largely related to the amount of the part of the magnetic flux flowing to the contact portions of the plunger and the inner circumferential surface of the housing. The friction force is increased with increase of the amount of the part of the magnetic flux flowing to the contact portions. Further, upon movement of the plunger while the magnetic flux flows within the plunger, an electromotive force is generated based on an electromagnetic induction. This electromotive force is increased with increase of the amount of the magnetic flux flowing within the plunger, and acts in a direction that impedes movement of the plunger. Further, the electromotive force generated based on the electromagnetic induction is changed depending on velocity of the movement of the plunger, and is increased with increase of the movement velocity of the plunger. The electromotive force is not generated while the plunger is not being moved. In this sense, the electromotive force, which is increased with increase of the movement velocity of the plunger, is suitable for damping self-vibration of the plunger. On the other hand, the electromotive force, which is generated by the electromagnetic induction, does not much affect control for the pressure difference between the high-pressure-side working fluid pressure and the low-pressure-side working fluid pressure. This is because the electromotive force is not generated during stop of the movement of the plunger, and the amount of the electromotive force generated during the movement of the plunger at a low velocity is considerably small.

In each of the electromagnetic linear valves according to the present invention, as described above, the amount of the part of the magnetic flux flowing to the contact portions of the plunger and the inner circumferential surface of the housing, is smaller than the amount of the entire magnetic flux flowing within the plunger. Thus, it is possible to increase the amount of the magnetic flux flowing within the plunger and to reduce the amount of the part of the magnetic flux flowing to the contact portions of the plunger and the inner circumferential surface of the housing. Therefore, in each of the electromagnetic linear valves according to the invention, the electromotive force based on the electromagnetic induction whose amount is enlarged to a certain degree, can be generated, while the friction force generated between the plunger and the inner circumferential surface of the housing can be reduced. That is, the self-vibration of the plunger can be restrained without a large friction force being generated between the plunger and the inner circumferential surface of the housing.

(B) Modes of the Invention

There will be described various modes of the invention (hereinafter referred to as "claimable invention" where appropriate) deemed to contain claimable features for which protection is sought. Each of these modes of the invention is numbered like the appended claims and depends from the other mode or modes, where appropriate, for easier understanding of the technical features disclosed in the present specification. It is to be understood that the claimable invention is not limited to the technical features or any combinations thereof which will be described in each of these modes. That is, the scope of the claimable invention should be interpreted in the light of the following descriptions accompanying the various modes and preferred embodiment of the invention. In a limit in accordance with such an interpretation, a mode of the claimable invention can be constituted by not only any one of these modes but also either a mode provided by any one of these modes and additional component or components incorporated therein and a mode provided by any one of these modes without some of components recited therein.

In the following modes, mode (1) corresponds to claim 1; a combination of claim 1 with technical feature described in mode (2) corresponds to claim 2; a combination of claim 1 or 2 with technical feature described in mode (5) corresponds to claim 3; a combination of any one of claims 1-3 with technical feature described in mode (6) corresponds to claim 4; a combination of any one of claims 1-4 with technical features described in modes (7)-(9) corresponds to claim 5; a combination of any one of claims 1-5 with technical features described in modes (7) and (12) corresponds to claim 6; a combination of any one of claims 1-6 with technical features described in modes (7) and (13) corresponds to claim 7; a combination of claim 7 with technical features described in modes (14) and (15) corresponds to claim 8; a combination of claim 8 with technical feature described in mode (16) corresponds to claim 9; a combination of any one of claims 1-9 with technical features described in modes (17) and (18) corresponds to claim 10; a combination of any one of claims 1-10 with technical feature described in mode (19) corresponds to claim 11; a combination of claim 11 with technical feature described in mode (22) corresponds to claim 12; and mode (23) corresponds to claim 13.

(1) An electromagnetic linear valve comprising:

a housing having a dividing portion that divides an interior of the housing into a first fluid chamber and a second fluid chamber, the housing having a through-hole that passes through the dividing portion such that the first and second fluid chambers are to be in communication with each other via the through-hole, the interior of the housing being filled with a working fluid;

a plunger movable in an axial direction thereof and located in the first fluid chamber in which the through-hole opens through an opening thereof, the plunger including an end portion which serves as a valve body and which is seatable on the opening serving as a valve seat;

an inlet port provided in the housing and being in communication with the second fluid chamber;

an outlet port provided in the housing and being in communication with the first fluid chamber;

an elastic body forcing the plunger in a forcing direction corresponding to one of a direction that causes the end portion to be moved toward the opening and a direction that causes the end portion to be moved away from the opening; and a coil disposed to surround the housing and configured to form a magnetic field that causes the plunger to be moved in a direction that is opposite to the forcing direction, wherein the plunger has a stepped shape, and includes (a) a large outside-diameter portion which is made of a ferromagnetic material and which includes an end portion constituted by another end portion of the plunger that is opposite to the end portion of the plunger, and (b) a small outside-diameter portion which is made of a ferromagnetic material and which is contiguous to the large outside-diameter portion so as to be located on a side of the end portion of the plunger, wherein the housing includes (c) a large inside-diameter portion which is made of a ferromagnetic material and in which the large outside-diameter portion is inserted with a clearance being defined between the large inside-diameter portion and the large outside-diameter portion, and (d) a small inside-diameter portion which is made of a ferromagnetic material and in which the small outside-diameter portion is inserted with a clearance being defined between the small inside-diameter portion and the small outside-diameter portion, the small inside-diameter portion being contiguous to the large inside-diameter portion, and wherein the clearance between the small inside-diameter portion and the small outside-diameter portion is smaller than the clearance between the large inside-diameter portion and the large outside-diameter portion.

In the electromagnetic linear valve, there is a risk that self-vibration could be caused upon opening and closing of the valve, since the plunger is supported by the elastic body within the housing. The generation of the self-vibration is not desirable, so that various methods for restraining the self-vibration have been conventionally studied. As one of such methods, there is a technique for increasing a friction force generated between the plunger and an inner circumferential surface of the housing. It might be possible to restrain the self-vibration, for example, by increasing the friction force generated between the plunger and the housing. However, if the friction force between the plunger and the housing is increased, there is a risk that the pressure difference between the high-pressure-side working fluid pressure and the low-pressure-side working fluid pressure could not be suitably controlled.

In the light of the background art described above, in the electromagnetic linear valve described in this mode (1), the plunger has a stepped shape, and the inner circumferential surface of the housing holding the stepped-shaped plunger also has a stepped shape. Further, the clearance defined between the small outside-diameter portion and the small inside-diameter portion is smaller than the clearance defined between the large outside-diameter portion and the large inside-diameter portion. Owing to such a construction, during movement of the plunger, the small outside-diameter portion and the small inside-diameter portion are caused to be in sliding contact with each other, while the large outside-diameter portion and the large inside-diameter portion are not caused to be in contact with each other. Further, since a cross sectional area of the plunger is changed abruptly at a boundary between the large outside-diameter portion and the small outside-diameter portion, an amount of the part of the magnetic flux flowing to contact portions at which the plunger and the inner circumferential surface of the housing are in contact with each other, is made smaller than an amount of the entire magnetic flux flowing within the plunger, due to magnetic saturation taking place in the small outside-diameter portion of the plunger. That is, even if a certain amount of the magnetic flux flows within the plunger, it is possible to reduce the amount of the part of the magnetic flux flowing to the contact portions of the plunger and the inner circumferential surface of the housing.

As described below in detail, the friction force generated between the plunger and the inner circumferential surface of the housing is largely related to the amount of the part of the magnetic flux flowing to the contact portions of the plunger and the inner circumferential surface of the housing. The friction force is increased with increase of the amount of the part of the magnetic flux flowing to the contact portions. On the other hand, as described below in detail, the electromotive force, which is based on the electromagnetic induction generated upon movement of the plunger, is largely related to the amount of the magnetic flux flowing within the plunger. The electromotive force is increased with increase of the amount of the magnetic flux flowing within the plunger, and acts in a direction that impedes movement of the plunger. Therefore, in the electromagnetic linear valve according to this mode (1), it is possible to generate the electromotive force whose amount is enlarged to a certain degree and to reduce the friction force generated between the plunger and the inner circumferential surface of the housing. That is, the self-vibration of the plunger can be restrained without a large friction force being generated between the plunger and the inner circumferential surface of the housing.

The "coil" recited in this mode (1) may be fixedly disposed on the outer circumferential surface of the housing so as to surround the outer circumferential surface of the housing such that the magnetic flux is caused to flow in the axial direction within the plunger upon formation of the magnetic field. Further, the "clearance between the small outside-diameter portion and the small inside-diameter portion", which is recited in this mode (1), may be either a difference between an outside diameter of the small outside-diameter portion and an inside diameter of the small inside-diameter portion, or a distance between the outer circumferential surface of the small outside-diameter portion and the inner circumferential surface of the small inside-diameter portion in a state in which an axis of the plunger and an axis of the housing are aligned with each other. Similarly, the "clearance between the large outside-diameter portion and the large inside-diameter portion", which is recited in this mode (1), may be either a difference between an outside diameter of the large outside-diameter portion and an inside diameter of the large inside-diameter portion, or a distance between the outer circumferential surface of the large outside-diameter portion and the inner circumferential surface of the large inside-diameter portion in a state in which the axis of the plunger and the axis of the housing are aligned with each other.

(2) The electromagnetic linear valve according to mode (1), being constructed such that, upon movement of the plunger within the housing, the small outside-diameter portion and the small inside-diameter portion are in sliding contact with each other, without the large outside-diameter portion and the large inside-diameter portion being in sliding contact with each other.

In the electromagnetic linear valve described in this mode (2), only the small outside-diameter portion and the small inside-diameter portion are in contact with each other, upon contact of the plunger and the inner circumferential surface of the housing with each other.

(3) The electromagnetic linear valve according to mode (1) or (2), being constructed such that, upon formation of the magnetic field by the coil, a magnetic force is generated between an outer circumferential surface of the large outside-diameter portion and an inner circumferential surface of the large inside-diameter portion, and acts in a direction that causes the outer circumferential surface of the large outside-diameter portion and the inner circumferential surface of the large inside-diameter portion to be moved toward each other.

(4) The electromagnetic linear valve according to any one of modes (1)-(3), being constructed such that, upon formation of the magnetic field by the coil, a magnetic force is generated between an outer circumferential surface of the small outside-diameter portion and an inner circumferential surface of the small inside-diameter portion, and acts in a direction that causes the outer circumferential surface of the small outside-diameter portion and the inner circumferential surface of the small inside-diameter portion to be moved toward each other.

In the electromagnetic linear valve described in mode (3), the magnetic flux is caused to flow between the large outside-diameter portion and the large inside-diameter portion. In the electromagnetic linear valve described in mode (4), the magnetic flux is caused to flow between the small outside-diameter portion and the small inside-diameter portion. The "magnetic force", which is recited in each of these modes (3) and (4), corresponds to a force causing two objects to be attracted to each other, and corresponds to an attractive force generated between two objects.

(5) The electromagnetic linear valve according to any one of modes (1)-(4), wherein a ratio of an outside diameter of the small outside-diameter portion to an outside diameter of the large outside-diameter portion is not smaller than ½ and is not larger than ⅘.

With reduction of the ratio of the outside diameter of the small outside-diameter portion to the outside diameter of the large outside-diameter portion, the amount of the magnetic flux flowing in the small outside-diameter portion is reduced whereby the friction force generated between the plunger and the inner circumferential surface of the housing can be reduced. However, if the ratio of the outside diameter of the small outside-diameter portion to the outside diameter of the large outside-diameter portion is too small, there is a risk that the amount of the magnetic flux flowing in the plunger could be affected. Therefore, according to the electromagnetic linear valve according to this mode (5), it is possible to reduce the friction force generated between the plunger and the inner circumferential surface of the housing, while obtaining a required amount of the magnetic flux flowing within the plunger.

(6) The electromagnetic linear valve according to any one of modes (1)-(5), wherein a ratio of the clearance between the small inside-diameter portion and the small outside-diameter portion to the clearance between the large inside-diameter portion and the large outside-diameter portion is not smaller than ¹⁄₁₀ and is not larger than ⅕.

If the clearance between the large outside-diameter portion and the large inside-diameter portion is too large, there is a risk that the amount of the magnetic flux flowing within the plunger could be affected. Further, if the clearance between the large outside-diameter portion and the large inside-diameter portion is too small, there is a risk that the large outside-diameter portion and the large inside-diameter portion could be brought into contact with each other. According to the electromagnetic linear valve described in this mode (6), it is possible to avoid contact of the large outside-diameter portion and the large inside-diameter portion with each other, while obtaining a required amount of the magnetic flux flowing within the plunger.

(7) The electromagnetic linear valve according to any one of modes (1)-(6),
wherein the plunger includes a rod portion which is contiguous to the small outside-diameter portion and which is located on a side of the end portion of the plunger,
wherein the rod portion has an outside diameter smaller than an outside diameter of the small outside-diameter portion, and includes a rod end portion which serves as the valve body.

In the electromagnetic linear valve described in this mode (7), the plunger has a stepped shape such that the diameter of the plunger is reduced in two steps as viewed in a direction toward the end portion that serves as the valve body.

(8) The electromagnetic linear valve according to mode (7), wherein the plunger is formed of a single material piece that is made of a ferromagnetic material.

In the electromagnetic linear valve described in this mode (8), the plunger is formed of a single material piece, rather than being formed of a plurality of pieces that are combined to each other. According to the electromagnetic linear valve described in this mode (8), it is possible to eliminate a step of combining the plurality of pieces to each other, thereby making it possible to reduce the manufacturing cost and to simplify the manufacturing process, for example.

(9) The electromagnetic linear valve according to mode (8), wherein a surface of at least a portion of the plunger, which serves as the valve body, is constituted by a hardened surface subjected to a surface heat treatment for increasing a hardness of the surface.

(10) The electromagnetic linear valve according to mode (8) or (9), wherein an entire surface of the plunger is constituted by a hardened surface subjected to a surface heat treatment for increasing a hardness of the entire surface.

(11) The electromagnetic linear valve according to mode (9) or (10), wherein the hardened surface is a surface subjected to a carburizing heat treatment as the surface heat treatment.

In an arrangement in which the plunger is formed of a single material piece that is made of a ferromagnetic material, the manufacturing cost can be reduced, for example. In this arrangement, not only the large outside-diameter portion and small outside-diameter portion but also the portion serving as the valve body has a ferromagnetic characteristic. In general, a hardness of a material having a ferromagnetic characteristic is low. It is preferable that a hardness of the portion serving as the valve body is high, since the valve body is to be seated on the valve seat. According to each of the electromagnetic linear valves described in the above three modes (9)-(11), the hardness of the valve body having the ferromagnetic characteristic can be increased.

The "surface heat treatment" described in each of the above two modes (9) and (10) is not particularly limited, as long as it is a surface modification for increasing a harness of a surface by heat. For example, the "surface heat treatment" may be performed by either a so-called surface quenching method, i.e., a method of rapidly heating the surface and then rapidly cooling the surface before an internal temperature is increased, or a so-called thermal diffusion method, i.e., a method of causing particular elements such as carbon and nitrogen to penetrate into the surface by heat. It is noted that, in the above mode (11), the surface heat treatment is a treatment in which the thermal diffusion method is carried out by causing carbon to penetrate into the surface.

(12) The electromagnetic linear valve according to any one of modes (7)-(11), wherein the first fluid chamber has:

(a) a large-outside-diameter-portion/small-inside-diameter-portion fluid chamber defined between shoulder surfaces, one of which interconnects an outer circumferential surface of the large outside-diameter portion and an outer circumferential surface of the small outside-diameter portion, and the other of which interconnects an inner circumferential surface of the large inside-diameter portion and an inner circumferential surface of the small inside-diameter portion; and (b) a small-outside-diameter-portion/dividing-portion fluid chamber defined between the dividing portion and a shoulder surface that interconnects the outer circumferential surface of the small outside-diameter portion and an outer circumferential surface of the rod portion, and wherein the small inside-diameter portion has, in addition to a communication passage constituted by the clearance between the small outside-diameter portion and the small inside-diameter portion, a small-inside-diameter-portion communication passage communicating between the large-outside-diameter-portion/small-inside-diameter-portion fluid chamber and the small-outside-diameter-portion/dividing-portion fluid chamber.

The first fluid chamber is divided, by the plunger disposed in the first fluid chamber, into a plurality of fluid chambers. It is considered that a presence of difference the fluid pressures of the working fluids in the respective fluid chambers constitutes one of factors causing the self-vibration of the plunger. In the electromagnetic linear valve described in this mode (12), the two fluid chambers, which are in communication with each other via the relatively narrow clearance defined between the small outside-diameter portion and the small inside-diameter portion, are in communication with each other also via a route other than the clearance. Therefore, according to the electromagnetic linear valve described in this mode (12), the fluid pressures of the working fluids in the respective two fluid chambers within the housing can be equal to each other whereby the self-vibration can be restrained. It is noted that the "small-inside-diameter-portion communication passage" recited in this mode (12) may be constituted by a through-hole formed through an interior portion of the small inside-diameter portion or a groove formed in the inner circumferential surface of the small inside-diameter portion.

(13) The electromagnetic linear valve according to any one of modes (7)-(12), wherein the housing includes a rod insertion portion contiguous to one of opposite ends of the small inside-diameter portion which is remote from the large inside-diameter portion, such that the rod portion is inserted in the rod insertion portion with a clearance being defined between the rod portion and the rod insertion portion, the rod insertion portion having an inside diameter smaller than an inside diameter of the small inside-diameter portion, and wherein the clearance between the small inside-diameter portion and the small outside-diameter portion is smaller than the clearance between the rod portion and the rod insertion portion.

An electromagnetic linear valve is constructed such that flow of a working fluid from a working fluid passage of a high-pressure side into a housing, is inhibited by causing a valve body to be seated on a valve seat. That is, when the valve body is separated from the valve seat, the working fluid is caused to vigorously flow from the working fluid passage of the high-pressure side toward the valve body. There is a case where the plunger is vibrated by the working fluid flowing vigorously into the housing, so that it is considered as one of factors causing the self-vibration of the plunger. In the electromagnetic linear valve described in this mode (13), the working fluid flowing vigorously into the housing is scattered by the rod insertion portion, thereby making it possible to restrain vibration of the plunger which is caused by the flow of the working fluid into the housing.

(14) The electromagnetic linear valve according to mode (13), wherein the first fluid chamber has a small-outside-diameter-portion/dividing-portion fluid chamber defined between the dividing portion and a shoulder surface that interconnects an outer circumferential surface of the small outside-diameter portion and an outer circumferential surface of the rod portion, wherein the small-outside-diameter-portion/dividing-portion fluid chamber has (a) a small-outside-diameter-portion/rod-insertion-portion fluid chamber defined between shoulder surfaces, one of which interconnects an outer circumferential surface of the small outside-diameter portion and an outer circumferential surface of the rod portion, and the other of which interconnects an inner circumferential surface of the small inside-diameter portion and an inner circumferential surface of the rod insertion portion, and (b) a rod-insertion-portion/dividing-portion fluid chamber defined between the rod insertion portion and the dividing portion, and wherein the rod insertion portion has, in addition to a communication passage constituted by a clearance between the rod portion and the rod insertion portion, a rod-insertion-portion communication passage communicating between the small-outside-diameter-portion/rod-insertion-portion fluid chamber and the rod-insertion-portion/dividing-portion fluid chamber.

In the electromagnetic linear valve described in this mode (14), the two fluid chambers, which are separated from each other by the rod insertion portion, are in communication with each other. Therefore, according to the electromagnetic linear valve described in this mode (14), the fluid pressures of the working fluids in the respective two fluid chambers within the housing can be equal to each other whereby the self-vibration can be restrained. It is noted that the "rod-insertion-portion communication passage" recited in this mode (14) may be constituted by a through-hole formed through an interior portion of the rod insertion portion or a groove formed in the inner circumferential surface of the rod insertion portion.

(15) The electromagnetic linear valve according to mode (14), wherein the rod-insertion-portion communication passage has an opening that opens in an outer circumferential surface of the housing, and wherein the opening serves as the outlet port.

According to the electromagnetic linear valve described in this mode (15), when the working fluid is caused to vigorously flow from the inlet port into the housing, the working fluid is scattered by the rod insertion portion and the scattered working fluid can be effectively guided to the outlet port.

(16) The electromagnetic linear valve according to mode (14) or (15), wherein the first fluid chamber further has a large-outside-diameter-portion/small-inside-diameter-portion fluid chamber defined between shoulder surfaces, one of which interconnects an outer circumferential surface of the large outside-diameter portion and an outer circumferential surface of the small outside-diameter portion, and the other of which interconnects an inner circumferential surface of the large inside-diameter portion and an inner circumferential surface of the small inside-diameter portion, wherein the small inside-diameter portion has, in addition to a communication passage constituted by the clearance between the small outside-diameter portion and the small inside-diameter portion, a small-inside-diameter-portion communication passage communicating between the large-outside-diameter-portion/small-inside-diameter-portion fluid chamber and the small-outside-diameter-portion/dividing-portion fluid chamber, and wherein the small-inside-diameter-portion communication passage communicates between the large-outside-diameter-portion/small-inside-diameter-portion fluid chamber and the small-outside-diameter-portion/rod-insertion-portion fluid chamber of the small-outside-diameter-portion/dividing-portion fluid chamber.

In the electromagnetic linear valve described in this mode (16), the three fluid chambers separated from one another by the plunger are in communication with one another. Therefore, according to the electromagnetic linear valve described in this mode (16), the fluid pressures of the working fluids in the respective fluid chambers within the housing can be more reliably equal to one another. It is noted that the "small-inside-diameter-portion communication passage" recited in this mode (16) may be connected directly to the above-described rod-insertion-portion communication passage so that the working fluid can flow between the small-inside-diameter-portion communication passage and the rod-insertion-portion communication passage without via the small-outside-diameter-portion/rod-insertion-portion fluid chamber.

(17) The electromagnetic linear valve according to any one of modes (1)-(16), wherein the housing includes (a) a large cylindrical member made of a ferromagnetic material and having an inside diameter that is larger than an outside diameter of the large outside-diameter portion, and (b) a small cylindrical member made of a ferromagnetic material and including a fitted portion that is fitted in the large cylindrical member, the fitted portion having an inside diameter that is larger than an outside diameter of the small outside-diameter portion and smaller than an outside diameter of the large outside-diameter portion, and wherein the fitted portion of the small cylindrical member serves as the small inside-diameter portion, while a portion of the large cylindrical member, in which the fitted portion is not fitted, serves as the large inside-diameter portion.

In the electromagnetic linear valve described in this mode (17), a wall surface of the housing is constituted by the two cylindrical members, wherein one of the two cylindrical members is fitted in the other of the two cylindrical members. According to this construction, the inner circumferential surface of the housing can be easily formed to have a stepped shape.

(18) The electromagnetic linear valve according to mode (17), being to be used while being attached to a base body, wherein the large cylindrical member has an annular groove at which the large cylindrical member is to be tightened by the base body when the electromagnetic linear valve is to attached to the base body, the annular groove being provided in an outer circumferential surface of a portion of the large cylindrical member in which the fitted portion is fitted, and wherein the large cylindrical member and the fitted portion of the small cylindrical member cooperate with each other to define an annular space between an inner circumferential surface of the large cylindrical member and an outer circumferential surface of the fitted portion, such that the annular space is located in a same position as the annular groove in the axial direction.

When the electromagnetic linear valve is attached to the base body, the housing is tightened at the annular groove that is provided in the outer circumferential surface of the housing, as described later in detail. In this instance, there is a risk that the housing could be deformed by tightening the housing. Further, there is a risk that the clearance between the plunger and the inner circumferential surface of the housing could be reduced as a result of deformation of the housing. In the electromagnetic linear valve described in this mode (18), even if the large cylindrical member of the housing is deformed upon attachment of the electromagnetic linear valve to the base body, the fitted portion is unlikely to be deformed since the annular space is defined between the fitted portion and the inner circumferential surface of the large cylindrical member. That is, even if the large cylindrical member of the housing is deformed upon attachment of the electromagnetic linear valve to the base body, an mount of the clearance between the plunger and the inner circumferential surface of the housing is unlikely changed. Therefore, according to the electromagnetic linear valve described in this mode (18), it is possible to provide the electromagnetic linear valve having a high reliability.

(19) The electromagnetic linear valve according to any one of modes (1)-(18), wherein the plunger is movable in a direction which causes the end portion of the plunger to be moved toward the opening of the through-hole and which is defined as an approaching direction, and is movable also in a direction which causes the end portion of the plunger to be moved away from the opening of the through-hole and which is defined as a separating direction, wherein the housing includes a core portion which is made of a ferromagnetic material and which is constituted by a separating-direction-side end portion of the housing, the separating-direction-side end portion being a downstream end portion of the housing in the separating direction, the core portion being opposed to an end face of the another end portion of the plunger, and wherein the elastic body is disposed between the core portion and the large outside-diameter portion of the plunger, and generates an elastic force forcing the plunger in the approaching direction, the electromagnetic linear valve being constructed such that, upon formation of the magnetic field by the coil, a magnetic force is generated between the core portion and the large outside-diameter portion, and acts in a direction that causes the core portion and the large outside-diameter portion to be moved toward each other.

The electromagnetic linear valve described in this mode (19) is a normally-close electromagnetic linear valve. It is known that, in general, the self-vibration of the plunger takes place more frequently in a normally-close electromagnetic linear valve than in a normally-open electromagnetic linear valve. Therefore, in the electromagnetic linear valve described in this mode (19), the effect of retraining the self-vibration of the plunger can be sufficiently utilized.

(20) The electromagnetic linear valve according to mode (19), comprising a cylindrical-shaped coil housing which is made of a ferromagnetic material and which is fixedly disposed on an outer circumferential surface of the housing such that the coil is surrounded by the coil housing, wherein a separating-direction-side end portion of the coil housing, which is a downstream end portion of the coil housing in the separating direction, is located on a downstream side, in the separating direction, of an end face of an end portion of the core portion, which is located on a side of the end portion of the plunger.

(21) The electromagnetic linear valve according to mode (19) or (20), comprising a cylindrical-shaped coil housing which is made of a ferromagnetic material and which is fixedly disposed on an outer circumferential surface of the housing such that the coil is surrounded by the coil housing, wherein an approaching-direction-side end portion of the coil housing, which is a downstream end portion of the coil housing in the approaching direction, is located on a downstream side, in the approaching direction, of a shoulder surface interconnecting an inner circumferential surface of the large inside-diameter portion and an inner circumferential surface of the small inside-diameter portion.

(22) The electromagnetic linear valve according to mode (19), comprising a cylindrical-shaped coil housing which is made of a ferromagnetic material and which is fixedly disposed on an outer circumferential surface of the housing such that the coil is surrounded by the coil housing, wherein a separating-direction-side end portion of the coil housing, which is a downstream end portion of the coil housing in the separating direction, is located on a downstream side, in the separating direction, of an end face of an end portion of the core portion, which is located on a side of the end portion of the plunger, and wherein an approaching-direction-side end portion of the coil housing, which is a downstream end portion of the coil housing in the approaching direction, is located on a downstream side, in the approaching direction, of a shoulder surface interconnecting an inner circumferential surface of the large inside-diameter portion and an inner circumferential surface of the small inside-diameter portion.

In the electromagnetic linear valve described in each of the above three modes (20)-(22), the coil housing is located in a limited position in the axial direction. By locating the approaching-direction-side end portion of the coil housing in a limited position, it is possible to suitably form the magnetic field for causing the plunger to be moved against an elastic force of the elastic body. By locating the separating-direction-side end portion of the coil housing in a limited position, it is possible to suitably form the magnetic field for causing the magnetic flux to flow to the small outside-diameter portion of the stepped-shaped plunger.

(23) An electromagnetic linear valve comprising:

a housing having a dividing portion that divides an interior of the housing into a first fluid chamber and a second fluid chamber, the housing having a through-hole that passes through the dividing portion such that the first and second fluid chambers are to be in communication with each other via the through-hole, the interior of the housing being filled with a working fluid;

a plunger movable in an axial direction thereof and located in the first fluid chamber in which the through-hole opens through an opening thereof, the plunger including an end portion which serves as a valve body and which is seatable on the opening serving as a valve seat;

an inlet port provided in the housing and being in communication with the second fluid chamber;

an outlet port provided in the housing and being in communication with the first fluid chamber;

an elastic body forcing the plunger in a forcing direction corresponding to one of a direction that causes the end portion to be moved toward the opening and a direction that causes the end portion to be moved away from the opening; and a coil disposed to surround the housing and configured to form a magnetic field that causes the plunger to be moved in a direction that is opposite to the forcing direction, wherein the plunger has two flux-passing portions which are contiguous to each other in the axial direction, such that a magnetic flux is caused to flow in the axial direction upon formation of a magnetic field by the coil, and wherein one of the two flux-passing portions is (a) a first flux-passing portion including an end portion that is constituted by the another end portion of the plunger, while the other of the two flux-passing portions is (b) a second flux-passing portion that is located on a side of the end portion of the plunger, such that the magnetic flux can be caused to flow by a larger amount within the first flux-passing portion than within the second flux-passing portion, the electromagnetic linear valve being constructed such that, upon movement of the plunger within the housing, the second flux-passing portion and the housing are in sliding contact with each other, while the first flux-passing portion and the housing are spaced apart from each other by a clearance defined therebetween without the first flux-passing portion and the housing being in sliding contact with each other, and the electromagnetic linear valve being constructed such that, upon flow of the magnetic flux through the first and second flux-passing portions, a part of the magnetic flux, which is disabled to flow to the second flux-passing portion as a result of magnetic saturation of the second flux-passing portion, is caused to flow between the first flux-passing portion and the housing via the clearance defined therebetween, while a part of the magnetic flux, which is allowed to flow to the second flux-passing portion, is caused to flow between the second flux-passing portion and the housing.

Further, in the electromagnetic linear valve described in this mode (23), when the magnetic flux flows between the plunger and the housing upon formation of the magnetic field, magnetic saturation takes place in the second flux-passing portion of the plunger since the second flux-passing portion of the plunger allows flow of the magnetic flux by a smaller amount therein than the first flux-passing portion of the plunger. In this instance, the magnetic flux flowing within the plunger is divided into a part flowing within the first flux-passing portion and a part flowing within the second flux-passing portion. Further, during movement of the plunger, the second flux-passing portion and the inner circumferential surface of the housing are in contact with each other, without the first flux-passing portion and the inner circumferential surface of the housing being in contact with each other. Therefore, an amount of the part of the magnetic flux flowing to contact portions at which the plunger and the inner circumferential surface of the housing are in contact with each other, is smaller than an amount of the magnetic flux flowing within the plunger. That is, even if a certain amount of the magnetic flux flows within the plunger, it is possible to reduce the amount of the part of the magnetic flux flowing to the contact portions of the plunger and the inner circumferential surface of the housing. Therefore, in the electromagnetic linear valve according to this mode (23), as well as in the electromagnetic linear valve according to this mode (1), it is possible to generate the electromotive force whose amount is enlarged to a certain degree and to reduce the friction force generated between the plunger and the inner circumferential surface of the housing. That is, the self-vibration of the plunger can be restrained without a large friction force being generated between the plunger and the inner circumferential surface of the housing.

The "plunger" recited in this mode (23) may be constructed such that, when the magnetic flux flows within the "plunger" in the axial direction, magnetic saturation takes places between the above-described end portion and another end portion of the "plunger" and such that the amount of a part of the magnetic flux flowing on a side of the end portion of the "plunger" and the amount of a part of the magnetic flux flowing on a side of the another end portion of the "plunger" are different from each other. Specifically, for example, as in the electromagnetic linear valve described in each of the above modes (1)-(22), an outside diameter of the second flux-passing portion may be smaller than an outside diameter of the first flux-passing portion. Further, for example, the first flux-passing portion and the second flux-passing portion may be formed of respective members that are made of respective materials different from each other, such that it is more difficult for the magnetic flux to pass through the second flux-passing portion than to pass through the first flux-passing portion.

BEST MODE FOR CARRYING OUT THE INVENTION

There will be described an embodiment of the claimable invention and some modifications of the embodiment, by reference to the accompanying drawings. It is to be understood that the claimable invention is not limited to the below-described embodiment and modifications, and may be otherwise embodied with various changes, such as those described in the foregoing "MODES OF THE INVENTION", which may occur to those skilled in the art.

<Embodiment>

1. Construction of Vehicle Hydraulic Brake System

Figure 1:
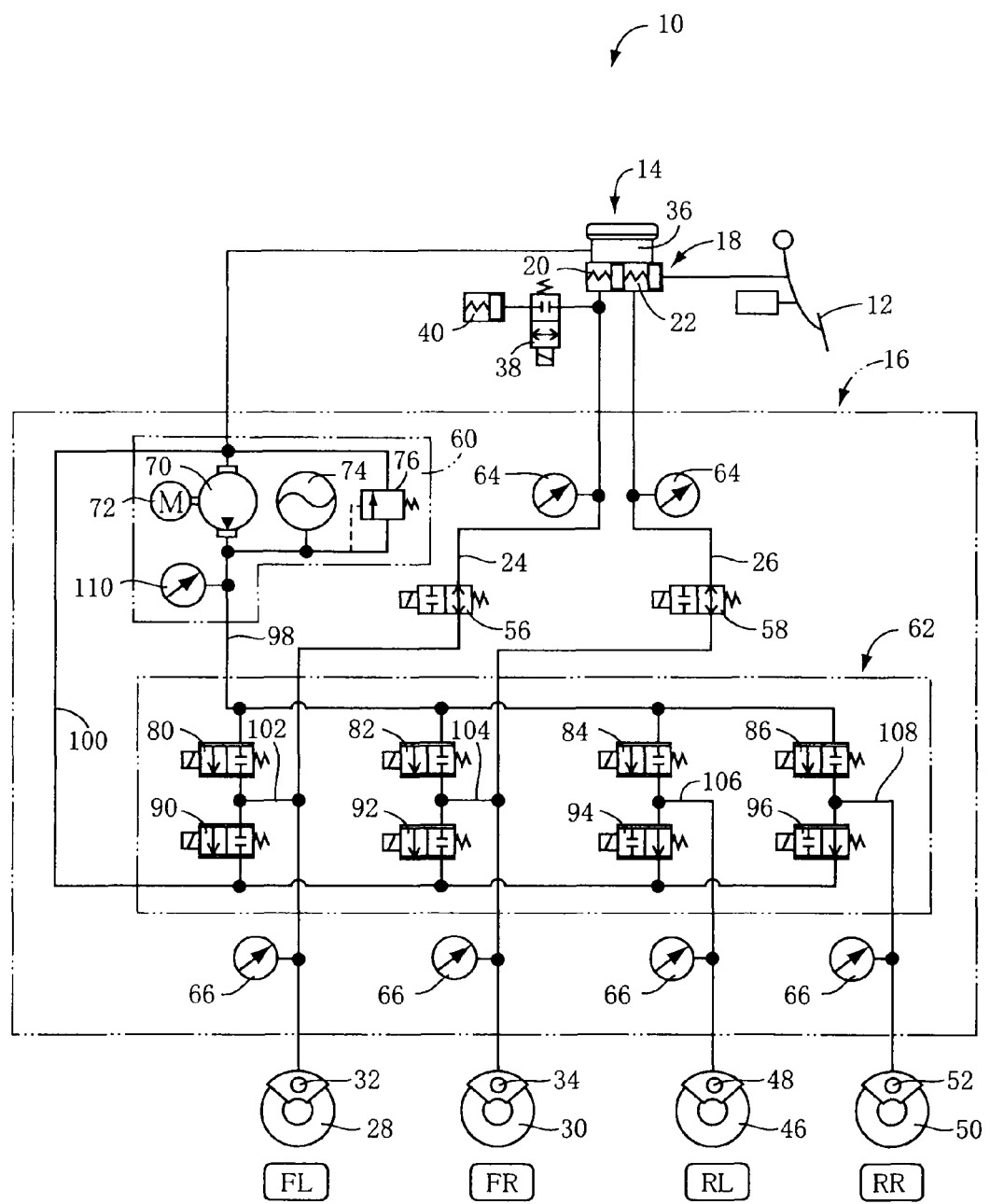
FIG. 1 is a view schematically showing a vehicle hydraulic brake system equipped with electromagnetic linear valves each of which is constructed according to an embodiment of the claimable invention.

FIG. 1 schematically shows a hydraulic brake system 10 that is to be installed on a vehicle. The hydraulic brake system 10 is equipped with electromagnetic linear valves each of which is constructed according to the embodiment of the invention. The hydraulic brake system 10 includes a brake pedal 12 as a brake operating member, a master cylinder device 14 and a brake actuator 16. The master cylinder device 14 has a master cylinder 18 that is configured to pressurize a working fluid (brake fluid) in accordance with depression of the brake pedal 12. The master cylinder 18 has two pressurized chambers 20, 22 such that the pressurized chamber 20 is connected to an end of a fluid passage 24 while the pressurized chamber 22 is connected to an end of a fluid passage 26. Another end of the fluid passage 24 is connected to a wheel cylinder 32 of a brake device that is configured to brake rotation of a front left wheel 28 of the vehicle. Another end of the fluid passage 26 is connected to a wheel cylinder 34 of a brake device that is configured to brake rotation of a front right wheel 30 of the vehicle. The master cylinder device 14 is provided with a reservoir 36 that is configured to store therein the working fluid such that a pressure of the stored working fluid is made equal to an atmospheric pressure. The working fluid is supplied from the reservoir 36 to the pressurized chambers 20, 22 of the master cylinder 18. It is noted that a stroke simulator 40 is connected, via an electromagnetic opening/closing valve 38, to the pressurized chamber 20 as one of the two pressurized chambers of the master cylinder 18.

The brake actuator 16 is configured to control fluid pressures in the above-described wheel cylinders 32, 34, a fluid pressure in a wheel cylinder 48 of a brake device that is configured to brake rotation of a rear left wheel 46 of the vehicle, and a fluid pressure in a wheel cylinder 52 of a brake device that is configured to brake rotation of a rear right wheel 50 of the vehicle. The brake actuator 16 has two master cut-off valves 56, 58, a power fluid pressure source 60 as a fluid pressure source, a fluid-pressure control valve device 62, two master-cylinder pressure sensors 64 and four wheel-cylinder pressure sensors 66. These components of the brake actuator 16 are attached to a block-shaped base body 68 (see FIG. 4).

The power fluid pressure source 60 has a pump 70 configured to pump the working fluid from the reservoir 36, an electric motor 72 configured to drive the pump 70, an accumulator 74 configured to store the working fluid discharged from the pump 70 and a relief valve 76 configured to regulate the pressure of the working fluid discharged from the pump 70. The accumulator 74 stores the working fluid with the stored working fluid being pressurized. The relief valve 76 regulates the pressure of the working fluid such that the regulated fluid pressure is held at a predetermined valve or less.

To the power fluid pressure source 60, the above-described four wheel cylinders 32, 34, 48, 52 are connected via the fluid-pressure control valve device 62. The fluid-pressure control valve device 62 includes electromagnetic pressure-increasing linear valves (hereinafter simply referred to as "pressure increasing valves" where appropriate) 80, 82, 84, 86 and electromagnetic pressure-reducing linear valves (hereinafter simply referred to as "pressure reducing valves" where appropriate) 90, 92, 94, 96. Each of the pressure increasing valves 80, 82, 84, 86 is configured to control flow of the working fluid from the pump 70 and/or the accumulator 74 to a corresponding one of the wheel cylinders 32, 34, 48, 52. Each of the pressure reducing valves 90, 92, 94, 96 is configured to control flow of the working fluid from a corresponding one of the wheel cylinders 32, 34, 48, 52 to the reservoir 36. The pump 70 and the accumulator 74 are connected to the pressure increasing valves 80-86 via a pressure increasing passage 98. The pressure reducing valves 90-96 are connected to the reservoir 36 via a pressure reducing passage 100. Each of the pressure increasing valves 80-86 and each of the pressure reducing valves 90-96 are provided for a corresponding one of the four wheel cylinders 32, 34, 48, 52. Four pairs of the pressure increasing valves 80-86 and pressure reducing valves 90-96 are connected to the respective four wheel cylinders 32, 34, 50, 52 via respective four wheel cylinder passages 102, 104, 106, 108.

Between the pump 70 and the pressure increasing valves 80-86, a source pressure sensor 110 is disposed to detect the fluid pressure in the power fluid pressure source 60. Further, the wheel cylinder passages 102-108 are provided with the wheel-cylinder pressure sensors 66 that are configured to detect the fluid pressures in the respective wheel cylinder 32, 34, 48, 52. The master cut-off valve 56 is disposed between the wheel cylinder 32 and the pressurized chamber 20 as one of the two pressurized chambers of the master cylinder 18. Similarly, the master cut-off valve 58 is disposed between the wheel cylinder 34 and the pressurized chamber 22 as the other of the two pressurized chambers of the master cylinder 18. Each of the master-cylinder pressure sensors 64 is disposed between a corresponding one of the master cut-off valves 56, 58 and a corresponding one of the pressurized chambers 20, 22.

2. Construction of Electromagnetic Linear Valve

Each of the pressure increasing valves 80-86 and pressure reducing valves 90-96 is constituted by an electromagnetic linear valve. In the electromagnetic linear valve, there is a predetermined relationship between a supplied electric current and a pressure difference of the working fluid on a high-pressure side and the working fluid on a low-pressure side. A valve opening pressure (i.e., a pressure required to open the valve) is changed depending on increase and reduction of the supplied electric current. Therefore, a wheel cylinder pressure as the fluid pressure in each of the wheel cylinders 32, 34, 48, 52 can be continuously changed by controlling the electric current supplied to a corresponding one of the pressure increasing valves 80-86 and a corresponding one of the pressure reducing valves 90-96. That is, the wheel cylinder pressure can be easily controlled to a desired level. In the present system 10, all of the pressure increasing valves 80-86 are constituted by normally close valves, the pressure reducing valves 90, 92 provided for the front right and left wheels 30, 28 are constituted by normally close valves, and the pressure reducing valves 94, 96 provided for the rear right and left wheels 50, 46 are constituted by normally open valves. Since the pressure increasing valves 80-86 and pressure reducing valves 90,92 constituted by the normally close valve are substantially the same in construction, the pressure increasing valve 80 will be described as a representative of these normally close valves.

Figure 2:
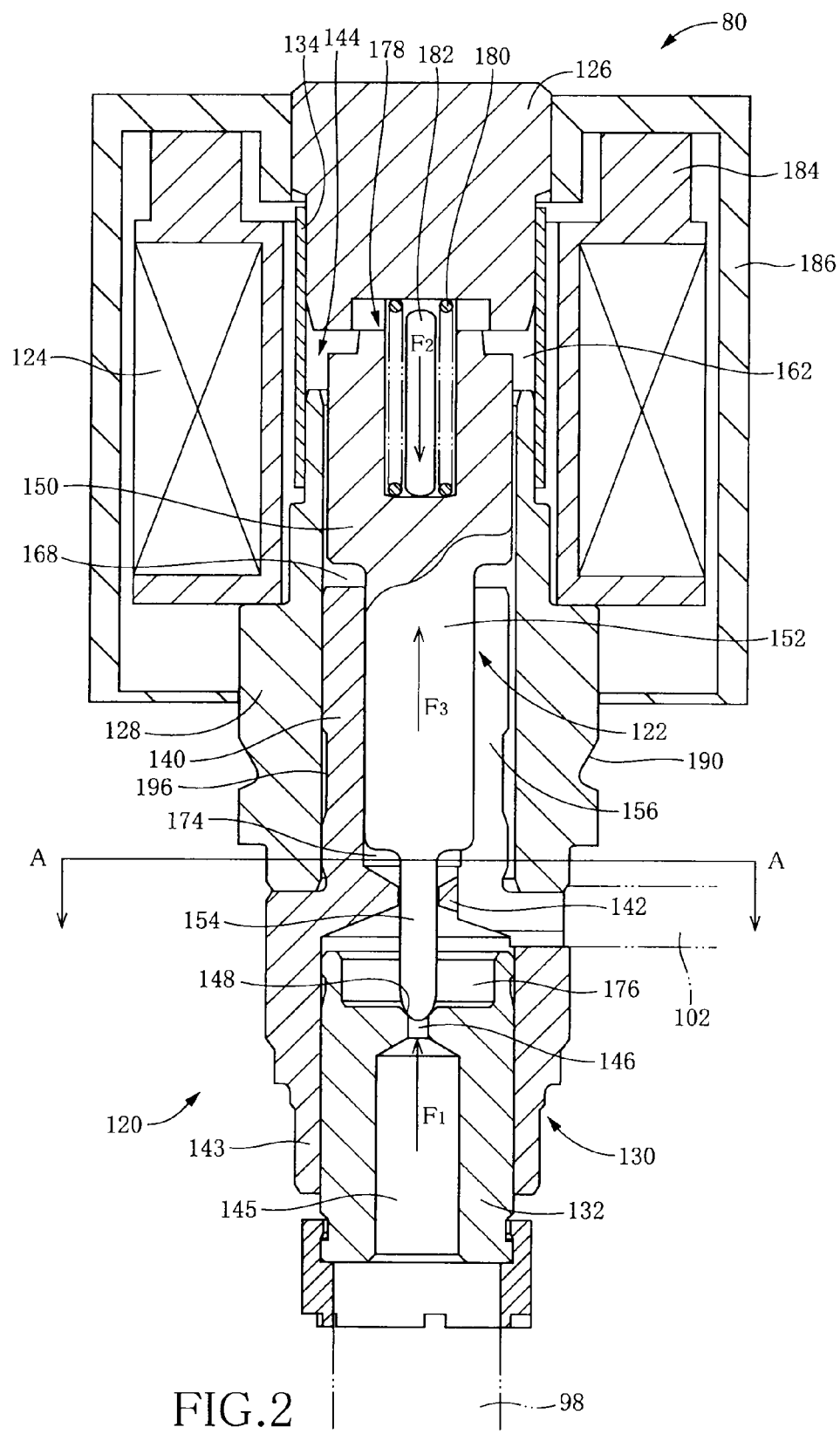
FIG. 2 is a schematic cross sectional view showing the electromagnetic linear valve that is provided in the vehicle hydraulic brake system of FIG. 1.

As shown in FIG. 2, the pressure increasing valve 80 includes a hollow-shaped housing 120, a plunger 122 disposed within the housing 120 and movable in a direction of its axis, and a cylindrical-shaped coil 124 disposed in an outer periphery of the housing 120. The housing 120 includes a fixed core 126 as a cylindrical-shaped core portion which is constituted by an upper end portion of the housing 120, a large cylindrical member 128 having a generally cylindrical shape and constituting an outer wall surface of the housing 120, a small cylindrical member 130 having a generally cylindrical shape and constituting the outer wall surface of the housing 120, and a valve member 132 having a cylindrical shape and a lid. The small cylindrical member 130 is introduced into the large cylindrical member 128 from a lower end portion of the large cylindrical member 128, and is fitted in the large cylindrical member 128. The valve member 132 is fitted in a lower end portion of the small cylindrical member 130. Each of the fixed core 126, large cylindrical member 128 and small cylindrical member 130 is made of a ferromagnetic material. The small cylindrical member 130 is fixedly fitted in the large cylindrical member 128, so that the large cylindrical member 128 and the small cylindrical member 130 are connected to each other, with the large and small cylindrical members 128, 130 being held in contact with each other. On the other hand, the fixed core 126 and the large cylindrical member 128 are connected to each other via a cylindrical sleeve 134 that is made of a non-ferromagnetic material, with the fixed core 126 and the large cylindrical member 128 being spaced apart from each other.

The small cylindrical member 130, which is fitted in the large cylindrical member 128, may be sectioned into a fitted portion 140, a protruding portion 142 and a lower end portion 143. The fitted portion 140 is fitted in the large cylindrical member 128. The protruding portion 142 is located on a lower side of the fitted portion 140, and has an inner wall surface that protrudes toward an axis of the small cylindrical member 130. The lower end portion 143 is located on a lower side of the protruding portion 142. The above-described valve member 132 is fixedly fitted in the lower end portion 143, and serves as a dividing portion for dividing an interior of the housing 120 into a first fluid chamber 144 and a second fluid chamber 145. The above-described plunger 122 is disposed in the first fluid chamber 144. The second fluid chamber 145 has an opening through which the second fluid chamber 145 opens in a lower end surface of the housing 120. The opening of the second fluid chamber 145 serves as an inlet port, so that the pressure increasing passage 98 as a working fluid passage of a high pressure side is connected to the second fluid chamber 145. The valve member 132 has a through-hole 146 passing therethrough in a direction of an axis of the valve member 132. An upper opening 148 of the through-hole 146 is tapered, and serves as a valve seat.

The plunger 122 is made of a ferromagnetic material, and is axially movably fitted in an interior of the housing 120 which is defined by cooperation of the fixed core 126, large cylindrical member 128, small cylindrical member 130 and valve member 132. The plunger 122 has a stepped shape, and is constituted by a large outside-diameter portion 150, a small outside-diameter portion 152 and a rod portion 154. The large outside-diameter portion 150 is constituted by an upper end portion of the plunger 122. The small outside-diameter portion 152 is located on a lower side of the large outside-diameter portion 150, and has an outside diameter smaller than an outside diameter of the large outside-diameter portion 150. The rod portion 154 is located on a lower side of the small outside-diameter portion 152, and has an outside diameter smaller than the outside diameter of the small outside-diameter portion 152. It is noted that a ratio of the outside diameter of the small outside-diameter portion 152 to the outside diameter of the large outside-diameter portion 150 is ⅗.

On the other hand, the inner wall surface of the housing 120 also has a stepped shape owing to the small cylindrical member 130 that is fitted in the large cylindrical member 128. A relationship between an inside diameter of the inner wall surface of the housing 120 and the outside diameter of the plunger 122 is as follows: an inside diameter of the large cylindrical member 128 as a large inside-diameter portion is slightly larger than an outside diameter of the large outside-diameter portion 150; an inside diameter of the fitted portion 140 of the small cylindrical member 130 is smaller than the outside diameter of the large outside-diameter portion 150 and is slightly larger than the outside diameter of the small outside-diameter portion 152; and an inside diameter of the protruding portion 142 of the small cylindrical member 130 is smaller than the outside diameter of the small outside-diameter portion 152 and is slightly larger than the outside diameter of the rod portion 154.

The large outside-diameter portion 150 of the plunger 122 is inserted in the large cylindrical member 128, the small outside-diameter portion 152 of the plunger 122 is inserted in the fitted portion 140 as a small inside-diameter portion, and the rod portion 154 of the plunger 122 is inserted in the protruding portion 142 as a rod insertion portion. There are a gap (clearance) between the large outside-diameter portion 150 and the large cylindrical member 128, a gap (clearance) between the small outside-diameter portion 152 and the fitted portion 140 and a gap (clearance) between the rod portion 154 and the protruding portion 142, so that the plunger 122 is smoothly movable within the housing 120. The clearance between the small outside-diameter portion 152 and the fitted portion 140 is smaller than the clearance between the large outside-diameter portion 150 and the large cylindrical member 128 and the clearance between the rod portion 154 and the protruding portion 142. Therefore, when the axis of the plunger 122 and the axis of the housing 120 are offset from each other, the plunger 122 and the housing 120 are in contact with each other at the small outside-diameter portion 152 and the fitted portion 140. That is, even if the axis of the plunger 122 and the axis of the housing 120 are offset from each other, the large outside-diameter portion 150 and the large cylindrical member 128 are not brought into contact with each other, and the rod portion 154 and the protruding portion 142 are not brought into contact with each other, either. It is noted that the clearance between the large outside-diameter portion 150 and the large cylindrical member 128 (i.e., difference between the outside diameter of the large outside-diameter portion 150 and the inside diameter of the large cylindrical member 128) is 0.4 mm, and that the clearance between the small outside-diameter portion 152 and the fitted portion 140 (i.e., difference between the outside diameter of the small outside-diameter portion 152 and the inside diameter of the fitted portion 140) is 0.06 mm.

Figure 3:
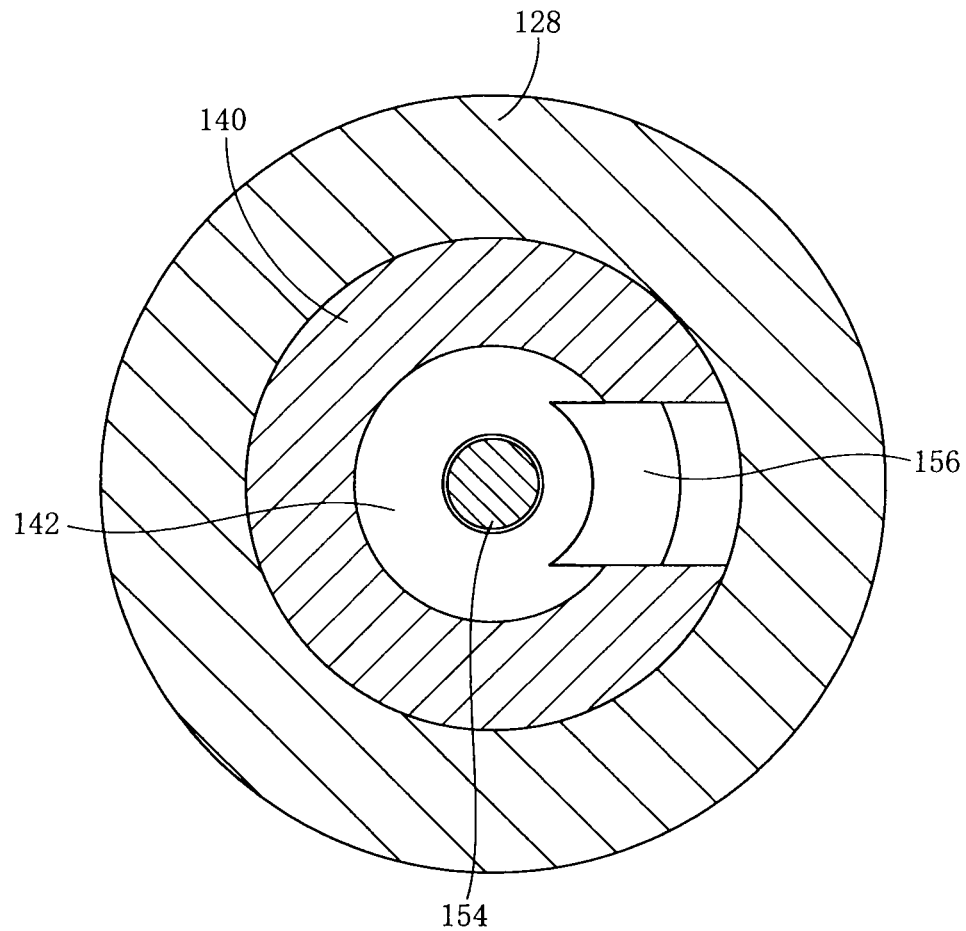
FIG. 3 is a schematic cross sectional view that is taken along line A-A shown in FIG. 2.

In the small cylindrical member 130 in which the small outside-diameter portion 152 and the rod portion 154 of the plunger 122 are inserted, a cutout portion 156 is provided to extend in the axial direction. As shown in FIG. 2 and FIG. 3 (that is a cross sectional view taken along line A-A in FIG. 2), the cutout portion 156 includes a portion constituted by a cutout part of a wall of the fitted portion 140 and a portion constituted by a cutout part of an outer wall surface of the protruding portion 142. The cutout portion 156 does not include a portion constituted by an inner wall surface of the protruding portion 142, since an inner wall surface of the protruding portion 142 does not include a cutout part. The plurality of fluid chambers within the housing 120 are in communication with each other via the cutout portion 156. The interior of the housing 120 is in communication with the wheel cylinder passages 102 as a working fluid passage of a low pressure side.

Described in detail, the first fluid chamber 144 of the housing 120 is constituted by four fluid chambers in the form of a first plunger fluid chamber 162, a second plunger fluid chamber 168, a third plunger fluid chamber 174 and a fourth plunger fluid chamber 176. The first plunger fluid chamber 162 is defined by the fixed core 126 and the large outside-diameter portion 150 of the plunger 122. The second plunger fluid chamber 168 is defined by an upper end surface of the small cylindrical member 130 and a shoulder surface interconnecting an outer circumferential surface of the large outside-diameter portion 150 and an outer circumferential surface of the small outside-diameter portion 152. The third plunger fluid chamber 174 is defined by two shoulder surfaces, one of which interconnects the outer circumferential surface of the small outside-diameter portion 152 and an outer circumferential surface of the rod portion 154, and the other of which interconnects an inner circumferential surface of the fitted portion 140 of the small cylindrical member 130 and an inner circumferential surface of the protruding portion 142. The fourth plunger fluid chamber 176 is defined by the protruding portion 142 and the valve member 132. Among these four fluid chambers, the second plunger fluid chamber 168 as a large-outside-diameter-portion/small-inside-diameter-portion fluid chamber, the third plunger fluid chamber 174 as a small-outside-diameter-portion/rod-insertion-portion fluid chamber and the fourth plunger fluid chamber 176 as a rod-insertion-portion/dividing-portion fluid chamber are in communication with one another via the cutout portion 156 that serves as a small-inside-diameter-portion communication passage and a rod-insertion-portion communication passage. The cutout portion 156 has, in its lower end portion, an opening that opens in an outer circumferential surface of the small cylindrical member 130, so that the opening of the cutout portion 156 serves as an outlet port. It is noted that the third plunger fluid chamber 174 and the fourth plunger fluid chamber 176 cooperate with each other to constitute a small-outside-diameter-portion/dividing-portion fluid chamber.

The rod portion 154 of the plunger 122 has a spherical shape in its lower end portion, and the spherical-shaped lower end portion of the rod portion 154 is opposed to the opening 148 of the through-hole 146 that is provided in the valve member 132. The lower end portion of the rod portion 154 is adapted to be seatable on the opening 148, so as to serve as a valve body. When the lower end portion of the rod portion 154 serving as the valve body is seated on the opening 148 serving as a valve seat, the through-hole 146 is closed. It is noted that the plunger 122 is formed by machining a single material piece that is made of a ferromagnetic material. The plunger 122, which is formed of the single material piece, is subjected to a surface heat treatment for increasing a hardness of a surface of the plunger 122. Described in detail, the entire surface of the plunger 122 is constituted by a hardened surface subjected to a carburizing heat treatment as the surface heat treatment, for increasing the hardness of the plunger 122, particularly, the hardness of the lower end portion of the plunger 122 serving as the valve body.

A blind hole 178 is provided in an upper end surface of the large outside-diameter portion 150 of the plunger 122, and a spring 180 is inserted in the blind hole 178. The spring 180 has an upper end portion that protrudes out from the upper end surface of the plunger 122, so that the spring 180 is disposed in the blind hole 178 while being compressed by the fixed core 126 and a bottom surface of the blind hole 178. Therefore, the plunger 122 is biased or forced by an elastic force of the spring 180 as an elastic body in a direction away from the fixed core 126. That is, the plunger 122 is forced in a direction (hereinafter referred to as "approaching direction" where appropriate) for causing the lower end portion of the rod portion 154 serving as the valve body to be moved toward the opening 148 serving as the valve seat. It is noted that a bar-like-shaped stopper 182 is inserted in the blind hole 178 so as to be surrounded by the spring 180 such that an upward movement of the plunger 122 is limited by the stopper 182.

The cylindrical-shaped coil 124 is held by a holding member 184 made of a resin, so as to be fixedly disposed in the outer periphery of the housing 120. The coil 124 together with the holding member 184 is covered by a coil housing 186 that is made of a ferromagnetic material. An upper end portion of the coil housing 186 is located on an upper side of a lower end surface of the fixed core 126 in an axial direction of the pressure increasing valve 80, while a lower end portion of the coil housing 186 is located on a lower side of an upper end portion of the small cylindrical member 130.

Owing to the above-described construction, with an electric current not being supplied to the coil 124, the pressure increasing valve 80 inhibits flow of the working fluid between the pressure increasing passage 98 and the wheel cylinder passages 102 in bilateral directions. With the electric current being supplied to the coil 124, the pressure increasing valve 80 allows the pressurized working fluid to flow from the pressure increasing passage 98 to the wheel cylinder 32 via the wheel cylinder passage 102, and changes a fluid pressure (hereinafter referred to as "wheel cylinder pressure" where appropriate) of the working fluid which acts on the wheel cylinder 32.

Described in detail, when the electric current is not being supplied to the coil 124, the distal end portion of the plunger 122 is being seated on the opening 148 of the through-hole 146 that is connected to the pressure increasing passage 98, owing to the elastic force of the spring 180, so that the pressure increasing valve 80 inhibits the bilateral flow of the working fluid between the pressure increasing passage 98 and the wheel cylinder passages 102. In this instance, a force F1, which is based on a difference between the wheel cylinder pressure and a fluid pressure (hereinafter referred to as "pressurized working fluid pressure" where appropriate) of the pressurized working fluid in the pressure increasing passage 98, is caused to act on the distal end portion of the plunger 122 serving as the valve body. This force F1 based on the pressure difference acts on a direction that is opposite to a direction in which the elastic force F2 of the spring 180 acts. Since the elastic force F2 is adapted to be larger than the force F1 based on the pressure difference, by a certain degree, the pressure increasing valve 80 is not placed in its open state, without the electric current being supplied to the coil 124.

On the other hand, when the electric current is supplied to the coil 124, a magnetic flux is caused to pass the coil housing 186, fixed core 126, plunger 122, large cylindrical member 128 and small cylindrical member 130, upon formation of a magnetic field. In this instance, there is generated a magnetic force that forces the plunger 122 to be moved in a direction (hereinafter referred to as "separating direction" where appropriate) for causing the lower end portion of the rod portion 154 to be moved away from the opening 148. When the magnetic field is formed as a result of supply of the electric current to the coil 124, a force F3 is generated based on the magnetic force that forces the plunger in an upward direction, so that a sum of the force F1 based on the pressure difference and the force F3 based on the magnetic force acts on the distal end portion of the plunger 122 serving as the valve body in one of opposite directions, while the elastic force F2 of the spring 180 acts on the distal end portion of the plunder 122 in the other of the opposite directions. In this instance, when the sum of the force F1 based on the pressure difference and the biasing force F3 based on the magnetic force is larger than the elastic force F2, the distal end portion of the plunger 122 is separated from the opening 148 so that the working fluid flows from the pressure increasing passage 98 to the wheel cylinder 32. Therefore, the pressurized working fluid can be caused to act in the wheel cylinder 32. Then, as a result of the increase of the wheel cylinder pressure, namely, as a result of reduction of the force F1 based on the pressure difference, when the sum of the force F1 and the force F3 becomes smaller than the elastic force F2, the pressure increasing valve 80 is placed in its closed state, so that the flow of the working fluid from the pressure increasing passage 98 into the wheel cylinder 32 is inhibited. Therefore, the wheel cylinder pressure is held at a value at a point of time at which the sum of the force F1 based on the pressure difference and the biasing force F3 based on the magnetic force becomes smaller than the elastic force F2. That is, by controlling an amount of the electric current that is to be supplied to the coil 124, it is possible to control the pressure difference between the wheel cylinder pressure and the pressurized working fluid pressure and to increase the wheel cylinder pressure to a target working fluid pressure.

The pressure reducing valves 90, 92, which are also constituted by normally close valves, are identical in constriction with the above-described pressure increasing valve 80. However, in each of the pressure reducing valves 90, 92, a corresponding one of the wheel cylinder passages 102, 104 is connected to the lower end portion of the through-hole 146 serving as the inlet port while the pressure reducing passage 100 is connected to the opening of the outer circumferential surface in which the cutout portion 156 opens. Therefore, each of the pressure reducing valves 90, 92 is capable of controlling the pressure difference between the wheel cylinder pressure and the pressure of the working fluid in the pressure reducing passage 100 and reducing the wheel cylinder pressure to the target working fluid pressure. It is noted that each of the pressure reducing valves 94, 96 constituted by normally close valves has the same construction as a pressure reducing valve disclosed in JP-2000-95094A, for example, so that a detailed description thereof will not be provided.

3. Attachment of Electromagnetic Linear Valve

The above-described pressure increasing valves 80-86 and pressure reducing valves 90-96 are attached to a block-like-shaped base body in which the working fluid passages are provided. The block-like-shaped base body has recessed portions for the respective pressure increasing valves 80-86 and pressure reducing valves 90-96, so that each of the pressure increasing valves 80-86 and pressure reducing valves 90-96 is attached into a corresponding one of the recessed portions. Since all of the valves 80-86, 90-96 are attached to the block-like-shaped base body substantially in the same manner, the pressure increasing valve 80 will be described as a representative one of the valves 80-86, 90-96.

Figure 4:
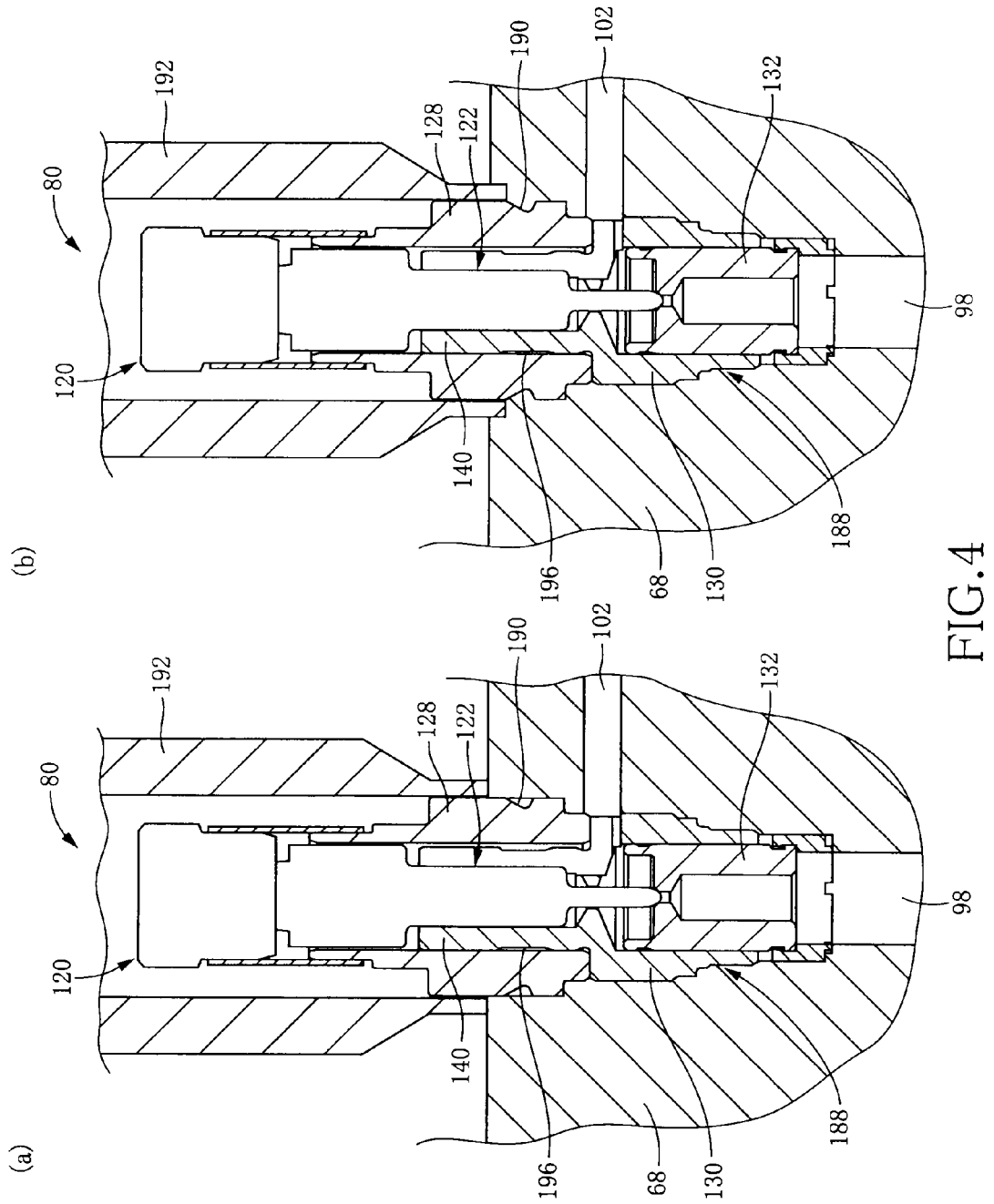
FIG. 4 is a set of schematic cross sectional views showing the electromagnetic linear valve that is attached to a base body.

The block-like-shaped base body 68 is made of an aluminum alloy, and has a recessed portion 188 that is shaped such that the large cylindrical member 128 and the small cylindrical member 130 constituting the housing 120 are fitted in the recessed portion 188 with substantially no clearance, as shown in FIG. 4. In the base body 68, the pressure increasing passage 98 and the wheel cylinder passages 102 are provided such that the pressure increasing passage 98 extends downwardly from a bottom surface of the recessed portion 188 and such that the wheel cylinder passage 102 extends laterally from a side surface of the recessed portion 188. When the pressure increasing valve 80 is to be attached to the base body 68, the pressure increasing valve 80 (to which some components such as the coil 124 and the coil housing 186 are not yet attached) is fitted at its lower side portion into the recessed portion 188, as shown in view (a) of FIG. 4. The pressure increasing valve 80 is fitted into the recessed portion 188 until an annular groove 190, which is provided in an outer circumferential surface of the large cylindrical member 128 of the housing 120, is introduced into the recessed portion 188.

Then, an outer periphery of an upper opening of the recessed portion 188 of the base body 68 is plastically deformed, as shown in view (b) of FIG. 4, by using a cylindrical-shaped tool 192 having an inside diameter that is slightly larger than the outside diameter of the large cylindrical member 128. A plastically deformed portion of the base body 68 is caused to be introduced into the annular groove 190 provided in the outer circumferential surface of the large cylindrical member 128, so that the large cylinder member 128 is tightened at the annular groove 190 by the plastically deformed portion of the base body 68, thereby preventing removal of the pressure increasing valve 80 from the base body 68 and preventing leakage of the working fluid. It is noted that an annular space 196 is provided between the inner circumferential surface of the large cylindrical member 128 and the outer circumferential surface of the fitted portion 140 of the small cylindrical member 130 such that the annular space 196 is located in the same position as the annular groove 190 in the axial direction. Thus, even if the large cylindrical member 128 is deformed as being tightened, the fitted portion 140 is not deformed. Since the clearance between the fitted portion 140 and the small outside-diameter portion 152 of the plunger 122 is considerably small, as described above, the deformation of the fitted portion 140 is not desirable.

4. Control of Vehicle Hydraulic Brake System

In the present brake system 10, owing to the above-described construction, an electric brake control is executed to change the wheel cylinder pressure in accordance with a depressed amount of the brake pedal 12 by controlling actuation of the brake actuator 16. Briefly described, in the electric brake control (that does not relate directly to the present invention), a target working fluid pressure is first determined based on the depressed amount of the brake pedal 12. Then, when the determined target working fluid pressure is higher than the wheel cylinder pressure, the pressure reducing valves 90-96 are placed in the closed states while the electric current is supplied to the coil 124 of each of the pressure increasing valves 80-86, for thereby increasing the wheel cylinder pressure to the target working fluid pressure. On the other hand, when the determined target working fluid pressure is lower than the wheel cylinder pressure, the pressure increasing valves 80-86 are placed in the open states while the electric current is supplied to the coil 124 of each of the pressure reducing valves 90-96, for thereby reducing the wheel cylinder pressure to the target working fluid pressure.

Figure 5:
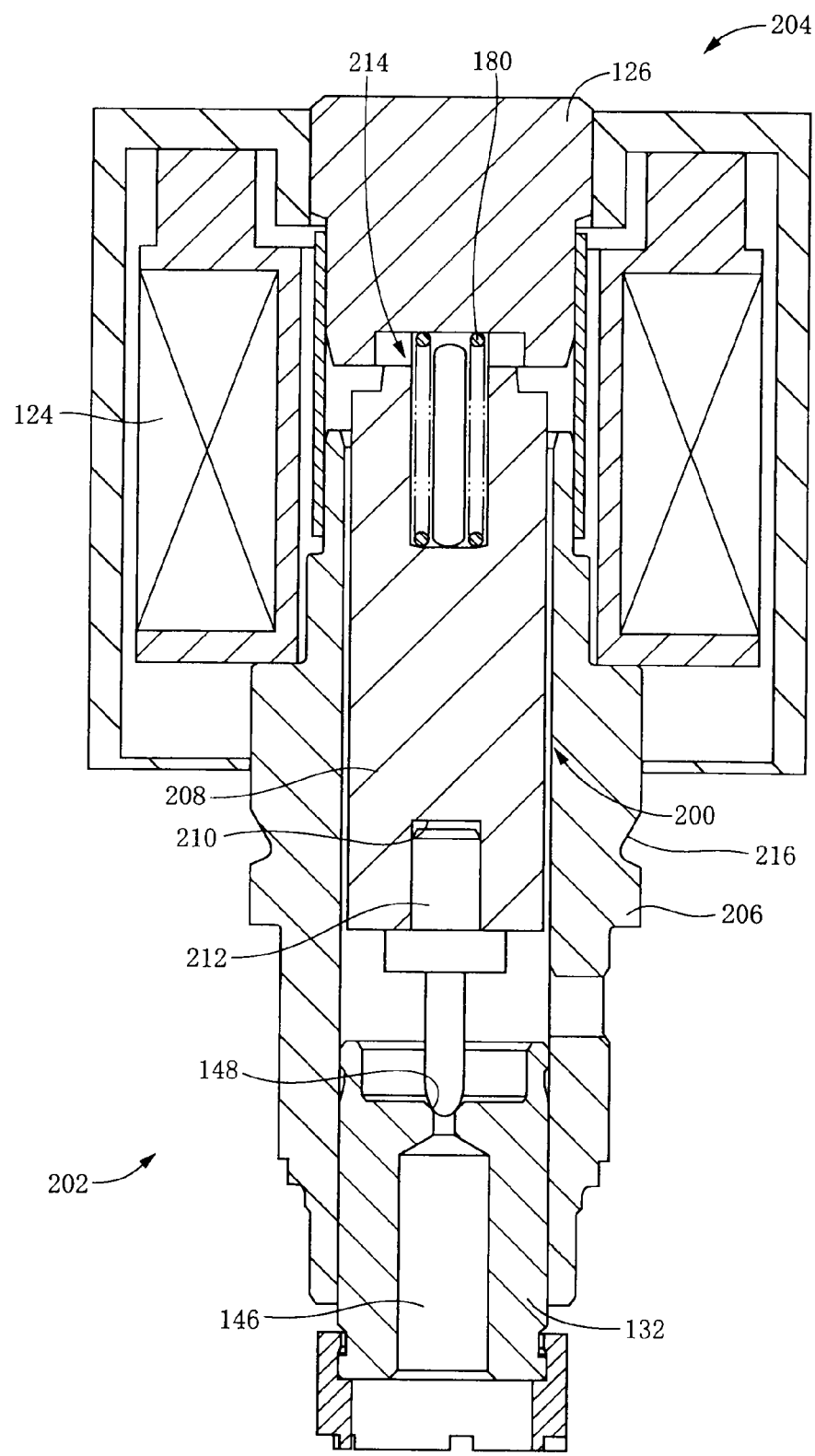
FIG. 5 is a schematic cross sectional view showing an electromagnetic linear valve as a comparative example.

5. Comparison of the Present Electromagnetic Linear Valve and Other Electromagnetic Linear Valve In each of the pressure increasing valves 80-86 and pressure reducing valves 90, 92 provided in the present system 10, the plunger 122 has a stepped shape, and the inner circumferential surface of the housing 120 holding plunger 122 therein has a stepped shape, too. FIG. 5 shows a comparative example in the form of an electromagnetic linear valve 204 that includes a generally columnar-shaped plunger 200 and an housing 202 having a constant inside diameter, so as to be compared with the electromagnetic linear valve having the above-described stepped-shaped plunger 122 and housing 120. The electromagnetic linear valve 204 as the comparative example is substantially identical in construction with the each of the electromagnetic linear valves 80-86, 90, 92 provided in the present system 10, except for the plunger 200 and the housing 202. Therefore, in the following description relating mainly to the plunger 200 and the housing 202, the same reference sings will be used to identify constructional elements having the same functions as those of the electromagnetic linear valves 80-86, 90, 92, and description of these elements will be omitted or simplified.

The housing 202 of the electromagnetic linear valve 204 as the comparative example has a generally cylindrical-shaped cylindrical member 206 that constitutes a wall surface of the housing 202 as shown in FIG. 5. The cylindrical member 206 is made of a ferromagnetic material, and has a constant inside diameter. The plunger 200 has a columnar-shaped main body 208 that is made of a ferromagnetic material, and is introduced in an interior of the cylindrical member 206 that has the constant inside diameter. The main body 208 of the plunger 200 has an outside diameter that is slightly smaller than the inside diameter of the cylindrical member 206. The plunger 200 is axially movable within the housing 202. It is noted that the outside diameter of the main body 208 of the plunger 200 is substantially the same as the outside diameter of the large outside-diameter portion 150 of the plunger 122 included in each of the electromagnetic linear valves 80-86, 90, 92 of the present system 10.

A blind hole 210 is provided in a lower end surface of the main body 208 of the plunger 200. A rod member 212, which is constituted by a member independent from the main body 208, is fixedly fitted in the blind hole 210. A lower end portion of the rod member 212 is opposed to the valve member 132 that is fitted in a lower end portion of the cylindrical member 206, and is to be seated on the opening 148 of the through-hole 146 that is provided in the valve member 132. That is, in the electromagnetic linear valve 204 as the comparative example, the lower end portion of the rod member 212 that is constituted by the member independent from the main body 208 serves as the valve body. Meanwhile, a blind hole 214 is provided in an upper end surface of the main body 208. The coil spring 180 is disposed between the fixed core 126 and a bottom surface of the blind hole 214 such that the coil spring 180 is compressed by the fixed core 126 and the bottom surface of the blind hole 214. On the outer circumferential surface of the housing 202, the coil 124 is disposed to form a magnetic field that causes the plunger 200 to be moved upwardly against the elastic force of the coil spring 180.

Like the electromagnetic linear valves 80-86, 90, 92 of the present system 10, owing to the above-described construction, when the electric current is not being supplied to the coil 124, the electromagnetic linear valve 204 as the comparative example is placed in the closed state. When the electric current is being supplied to the coil 124, the electromagnetic linear valve 204 allows the flow of the working fluid from the working fluid passage of the high-pressure side toward the working fluid passage of the low-pressure side, and changes the pressure difference between the working fluid pressure in the working fluid passage of the high-pressure side and the working fluid in the working fluid passage of the low-pressure side. In a case where the axis of the plunger and the axis of the housing are offset from each other upon movement of the plunger, the main body 208 of the plunger 200 and the cylindrical member 206 are brought into contact with each other in the electromagnetic linear valve 204 as the comparative example, while the small outside-diameter portion 152 of the plunger 122 and the fitted portion 140 of the small cylindrical member 130 are brought into contact with each other in each of the electromagnetic linear valves 80-86, 90, 92 of the present system 10. The friction force generated between the main body 208 and the cylindrical member 206 in the electromagnetic linear valve 204 as the comparative example tends to be larger than the friction force generated between the small outside-diameter portion 152 and the fitted portion 140 in each of the electromagnetic linear valves 80-86, 90, 92 of the present system 10.

Figure 6:
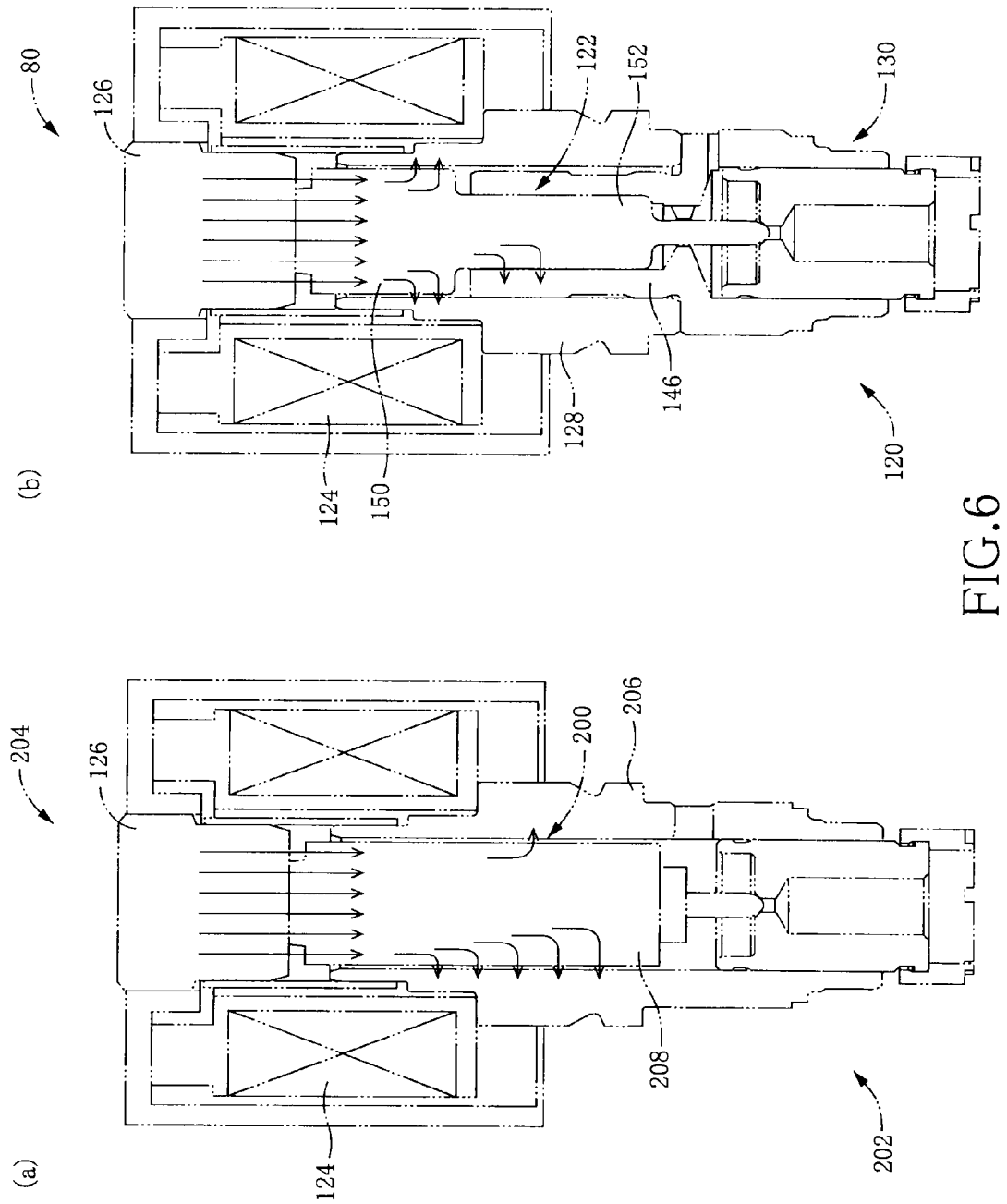
FIG. 6 is a set of views showing the electromagnetic linear valve of FIG. 2 and the electromagnetic linear valve as the comparative example.

Described in detail, in the electromagnetic linear valve 204 as the comparative example, when the electric current is being supplied to the coil 124, the magnetic field is formed whereby the magnetic flux is caused to flow through components of the valve 204 such as the housing 202, plunger 200 and coil housing 186. In this instance, lines of the magnetic force can be indicated by arrows in view (a) of FIG. 6. This view (a) of FIG. 6 represents a state in which the axis of the plunger 200 and the axis of the housing 202 are offset from each other such that the main body 208 of the plunger 200 is in contact at its left side surface (as seen in view (a) of FIG. 6) with the cylindrical member 206 of the housing 202. Where the magnetic flux corresponding to six lines of the magnetic force flows from the fixed core 126 to the upper end portion of the main body 208 as a result of supply of the electric current to the coil 124 in this state, for example, a part of the magnetic flux corresponding to five lines of the magnetic force is caused to flow to the side (i.e., left side as seen in view (a) of FIG. 6) at which the main body 208 and the cylindrical member 206 are in contact with each other, while another part of the magnetic flux corresponding to one line of the magnetic force is caused to flow to another side (i.e., right side as seen in view (a) of FIG. 6) at which the main body 208 and the cylindrical member 206 are not in contact with each other. In this instance, the plunger 200 is subjected to a force that is based on a difference between the part of the magnetic flux flowing to the side at which the main body 208 and the cylindrical member 206 are in contact with each other and the part of the magnetic flux flowing to the other side at which the main body 208 and the cylindrical member 206 are not in contact with each other. That is, between the plunger 200 and the cylindrical member 206, there is generated an attractive force based on a part of the magnetic force corresponding to four lines of the magnetic force, so that a friction force dependent on the attractive force is generated between the plunger 200 and the cylindrical member 206.

On the other hand, in each of the electromagnetic linear valves 80-86, 90, 92 of the present system 10, lines of the magnetic force, which is generated when the electric current is being supplied to the coil 124, can be indicated by arrows in view (b) of FIG. 6. This view (b) of FIG. 6 represents a state in which the axis of the plunger 122 and the axis of the housing 120 are offset from each other such that the small outside-diameter portion 152 of the plunger 122 is in contact at its left side surface (as seen in view (b) of FIG. 6) with the fitted portion 140 of the small cylindrical member 130 of the housing 120. Where the magnetic flux corresponding to six lines of the magnetic force flows from the fixed core 126 to the upper end portion of the large outside-diameter portion 150 of the plunger 122 as a result of supply of the electric current to the coil 124 in this state, for example, only a part of the magnetic flux corresponding to two lines of the magnetic force is caused to flow from the large outside-diameter portion 150 as a first flux-passing portion of the plunger 122 to the small outside-diameter portion 152 as a second flux-passing portion of the plunger 120. This is because, upon flow of the magnetic flux from the large outside-diameter portion 150 to the small outside-diameter portion 152, an area of a cross section through which the magnetic flux is caused to flow is abruptly reduced whereby a magnetic saturation takes place in the small outside-diameter portion 152. Therefore, another part of the magnetic flux, which is disabled to flow from the large outside-diameter portion 150 to the small outside-diameter portion 152, is caused to flow from the large outside-diameter portion 150 to the large cylindrical member 128 of the housing 120 via a clearance defined between the large outside-diameter portion 150 and the large cylindrical member 128. Described in detail, a part of the magnetic flux corresponding to two lines of the magnetic force and a part of the magnetic flux corresponding to two lines of the magnetic force, which are located on right and left sides (as seen in view (b) of FIG. 6), respectively, are caused to flow between the large outside-diameter portion 150 and the large cylindrical member 128. Further, the above-described part of the magnetic flux corresponding to the two lines of the magnetic force having been caused to flow from the large outside-diameter portion 150 to the small outside-diameter portion 152, is caused to flow to the side (i.e., left side as seen in view (a) of FIG. 6) at which the small outside-diameter portion 152 and the fitted portion 140 are in contact with each other. Therefore, between the plunger 122 and the inner circumferential surface of the housing 120, there is generated an attractive force based on the part of the magnetic force corresponding to the two lines of the magnetic force, so that a friction force dependent on the attractive force is generated between the small outside-diameter portion 152 and the fitted portion 140.

Therefore, where the same amount of the magnetic flux is caused to flow from the fixed core to the plunger, the friction force generated between the plunger and the inner circumferential surface of the housing can be made smaller in each of the electromagnetic linear valves 80-86, 90, 92 of the present system 10, than in the electromagnetic linear valve 204 as the comparative example. The friction force is generated between the plunger and the inner circumferential surface of the housing, irrespective of whether the plunger is stopped or moved, and serves as a force impeding movement of the plunger. The electromagnetic linear valve is configured to control the pressure difference between the working fluid pressure in the working fluid passage of the high-pressure side and the working fluid pressure in the working fluid passage of the low-pressure side, by controlling balance between the force acting on the plunger in the upward direction and the force acting on the plunger in the downward direction. Therefore, if the friction force impeding the movement of the plunger is large, there is a risk that the control of the pressure difference could be affected by the friction force. It is possible to more suitably control the pressure difference between the working fluid pressure of the high-pressure side and the working fluid pressure of the low-pressure side in each of the electromagnetic linear valves 80-86, 90, 92 of the present system 10, than in the electromagnetic linear valve 204 as the comparative example.

Further, there is a case where, in addition to the above-described friction force, another force impeding the movement of the plunger is generated. Upon movement of a conductive body in presence of flow of the magnetic flux, an electromotive force, i.e., a force impeding the movement of the conductive body is generated due to an electromagnetic induction effect. The electromotive force generated by the electromagnetic induction is increased with increase of velocity of the movement of the conductive body, and is not generated during stop of the conductive body. That is, also in an electromagnetic linear valve, if the plunger is moved during flow of the magnetic flux in, for example, the plunger and the housing upon energization of the coil, the above-described electromotive force is generated. However, the electromotive force generated by the electromagnetic induction is not generated during stop of the plunger, and the electromotive force is generated only by a considerably small amount during movement of the plunger at a low velocity. It is therefore possible to consider that the control of the pressure difference is little affected by the electromotive force.

In an electromagnetic linear valve, there is a problem of a self-vibration that could occur in control of the pressure difference. The self-vibration is an undesirable vibration of the plunger that occurs at a characteristic frequency that is dependent on a spring constant of the coil spring forcing the plunger. That is, it is desirable to restrain, namely, damp the self-vibration, and it is desirable that a large damping force is caused to act on the self-vibration. The above-described electromotive force generated by the electromagnetic induction is increased with increase of the movement of the plunger, so that the self-vibration can be suitably damped by the electromotive force. The electromotive force generated by the electromagnetic induction is dependent not only on the movement velocity of the plunger but also on the amount of the magnetic flux flowing in the plunger. That is, the electromagnetic force is increased with increase of the amount of the magnetic flux flowing in the plunger, as long as the movement velocity of the plunger remains unchanged. In each of the electromagnetic linear valves 80-86, 90, 92 of the present system 10, the amount of the magnetic flux flowing in the plunger 122 is substantially the same as the amount of the magnetic flux flowing in the plunger 200 of the electromagnetic linear valve 204 as the comparative example, since the outside diameter of the large outside-diameter portion 150 of the plunger 122 is substantially the same as the outside diameter of the main body 208 of the plunger 200. Therefore, in each of the electromagnetic linear valves 80-86, 90, 92 of the present system 10, the self-vibration can be reduced by the same degree as in the electromagnetic linear valve 204 as the comparative example. That is, in each of the electromagnetic linear valves 80-86, 90, 92 of the present system 10, the friction force between the plunger and the inner wall surface of the housing can be reduced without the self-vibration damping effect being made smaller than in the electromagnetic linear valve 204 as the comparative example.

Further, when the electromagnetic linear valve 204 as the comparative example is placed in the open state, the working fluid is caused to enter through the through-hole 146, and to flow within the housing 202, thereby upwardly forcing the lower surface of the main body 208 of the plunger 200. On the other hand, when each of the electromagnetic linear valves 80-86, 90, 92 of the present system 10 is placed in the open state, the working fluid is caused to enter through the through-hole 146. However, in this instance, the provision of the protruding portion 142 in the small cylindrical member 130 of the housing 120 makes it difficult for the working fluid (caused to enter through the through-hole 146) to flow toward a side of the lower surface of the small outside-diameter portion 152 of the plunger 122. Since a vigorous action of the working fluid (flowing into the housing) on the plunger is considered as one of factors causing the self-vibration of the plunger, it is possible to restrain the self-vibration more effectively in each of the electromagnetic linear valves 80-86, 90, 92 of the present system 10, than in the electromagnetic linear valve 204 as the comparative example.

Further, in each of the electromagnetic linear valves 80-86, 90, 92 of the present system 10, the plurality of fluid chambers within the housing 120 are held in communication with one another via the cutout portion 156 that is provided in the housing 120, so that the working fluid pressures in the respective fluid chambers within the housing 120 are made substantially the same as each other. On the other hand, in the electromagnetic linear valve 204, the working fluid flows between the chambers that are located on respective upper and lower sides of the main body 208 of the plunger 200, via the clearance defined between the main body 208 and the cylindrical member 206, so that there is a case where the working fluid pressure in the chamber located on the upper side of the main body 208 and the working fluid chamber located on the lower side of the main body 208 are different from each other. Since an unevenness in the working fluid pressure within the housing is also considered as one of the factors causing the self-vibration of the plunger, it is possible to retrain the self-vibration more effectively in each of the electromagnetic linear valves 80-86, 90, 92 of the present system 10, than in the electromagnetic linear valve 204 as the comparative example.

In the electromagnetic linear valve 204 as the comparative example, the wall surface of the housing 202 is constituted by the cylindrical member 206. Therefore, when the electromagnetic linear valve 204 is to be attached to the base body, if the cylindrical member 206 is tightened at a groove 216 provided in the outer circumferential surface of the cylindrical member 206, there is a risk that the clearance between the main body 208 of the plunger 200 and the cylindrical member 206 could be reduced as a result of possible deformation of the cylindrical member 206. On the other hand, as described above, in each of the electromagnetic linear valves 80-86, 90, 92 of the present system 10, the annular space 196 is provided between the large cylindrical member 128 and the fitted portion 140 of the small cylindrical member 130, so that there is no risk that the clearance between the fitted portion 140 and the small outside-diameter portion 152 could be reduced even if the large cylindrical member 128 were deformed. Therefore, each of the electromagnetic linear valves 80-86, 90, 92 of the present system 10 is an electromagnetic linear valve that is more reliable than the electromagnetic linear valve 204 as the comparative example.

<Modifications of the above-Described Embodiment>

Figure 7:
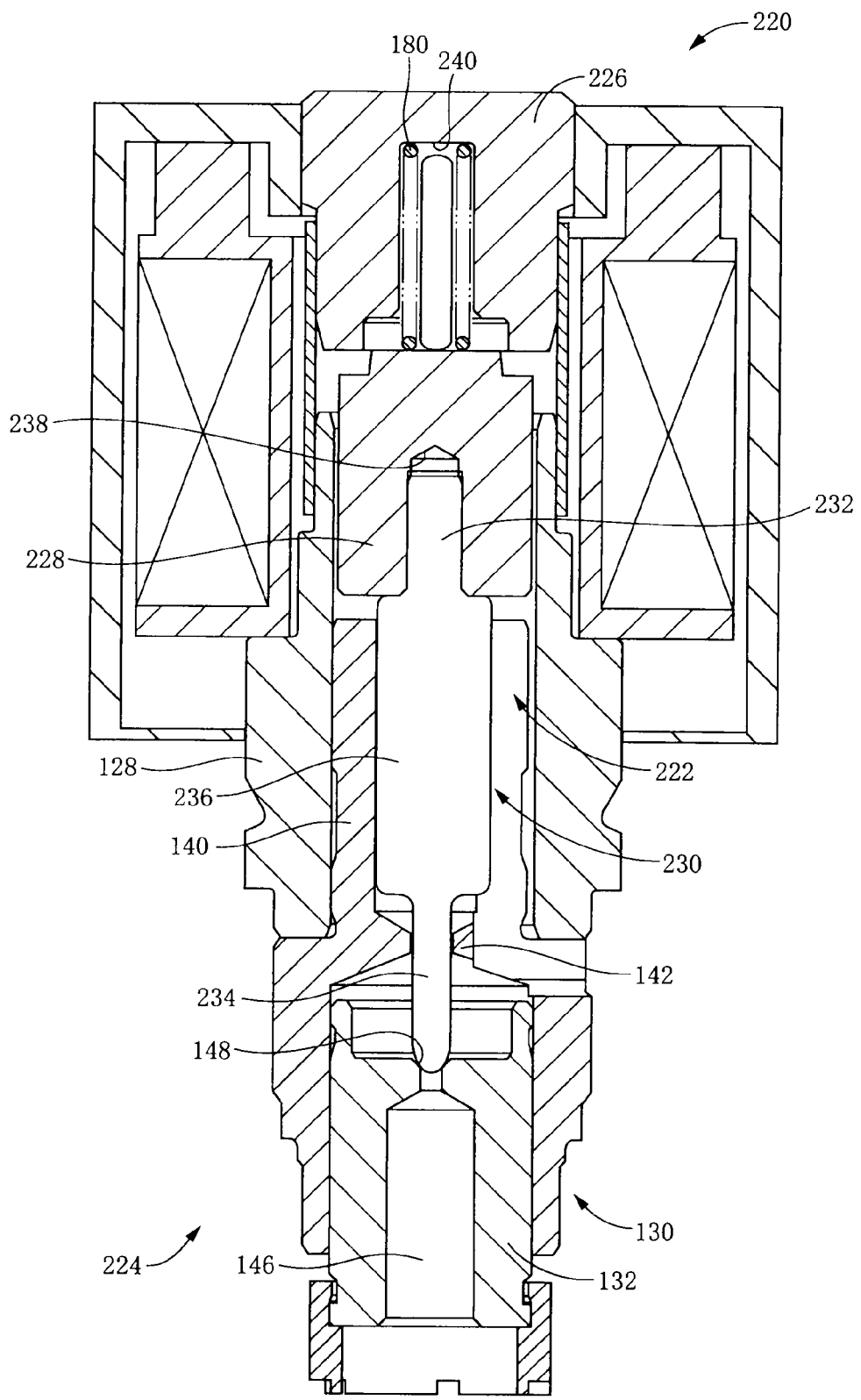
FIG. 7 is a schematic cross sectional view showing an electromagnetic linear valve constructed according to a modification of the embodiment.

FIG. 7 shows an electromagnetic linear valve 220 as a modification of the electromagnetic linear valve 80 of the above-described system 10. The electromagnetic linear valve 220 as the modification is substantially identical in construction with the electromagnetic linear valve 80 of the above-described system 10 except for a plunger 222 and a fixed core 226 that constitutes a housing 224. Therefore, in the following description relating mainly to the plunger 222 and the fixed core 226, the same reference sings will be used to identify constructional elements having the same functions as those of the electromagnetic linear valve 80, and description of these elements will be omitted or simplified.

The plunger 222, which is included in the electromagnetic linear valve 220 as the modification, is constituted by a generally columnar-shaped columnar member 228 and a generally stepped-shaped stepped member 230 that is fixed to a lower end portion of the columnar member 228. The stepped member 230 can be sectioned into a press-fitted portion 232 that is located in its upper end portion, a rod portion 234 that is located in its lower end portion and a sliding contact portion 236 that is located between the press-fitted portion 232 and the rod portion 234. A blind hole 238 is provided in a lower end surface of the columnar member 228, and receives the press-fitted portion 232 of the stepped member 230 which is press-fitted in the blind hole 238. The plunger 222, which is constituted by the stepped member 230 and the columnar member 228 that are combined to each other, has the same shape and size as those of the plunger 122 of the above-described electromagnetic linear valve 80. The columnar member 228 as the large outside-diameter portion is inserted in the large cylindrical member 128. The sliding contact portion 236 as the small outside-diameter portion is inserted in the fitted portion 140 of the small cylindrical member 130. The rod portion 234 is inserted in the protruding portion 142 of the small cylindrical member 130. Therefore, in the electromagnetic linear valve 220 as the modification, upon movement of the plunger 220 with the axis of the plunger 222 and the axis of the housing 224 being offset from each other, the sliding contact portion 236 and the fitted portion 140 are brought into contact with each other, without the columnar member 228 and the large cylindrical member 128 being brought into contact with each other, and without the rod portion 234 and the protruding portion 142 being brought into contact with each other.

A blind hole 240 is provided in a lower end surface of the fixed core 226 that constitutes the housing 224. The coil spring 180 is disposed between a bottom surface of the blind hole 240 and an upper end surface of the columnar member 228 such that the coil spring 180 is compressed by the bottom surface of the blind hole 240 and the upper end surface of the columnar member 228. Owing to an elastic force of the coil spring 180, the plunger 222 is forced downwardly, and a lower end portion of the rod portion 234 of the stepped member 230 is seated on the opening 148 of the through-hole 146 that is provided in the valve member 132. That is, the lower end portion of the rod portion 234 serves as a valve body. It is noted that each of the stepped member 230 and the columnar member 228 is made of a ferromagnetic material, and that only a surface of the stepped member 230 is constituted by a surface subjected to a carburizing heat treatment.

Figure 8:
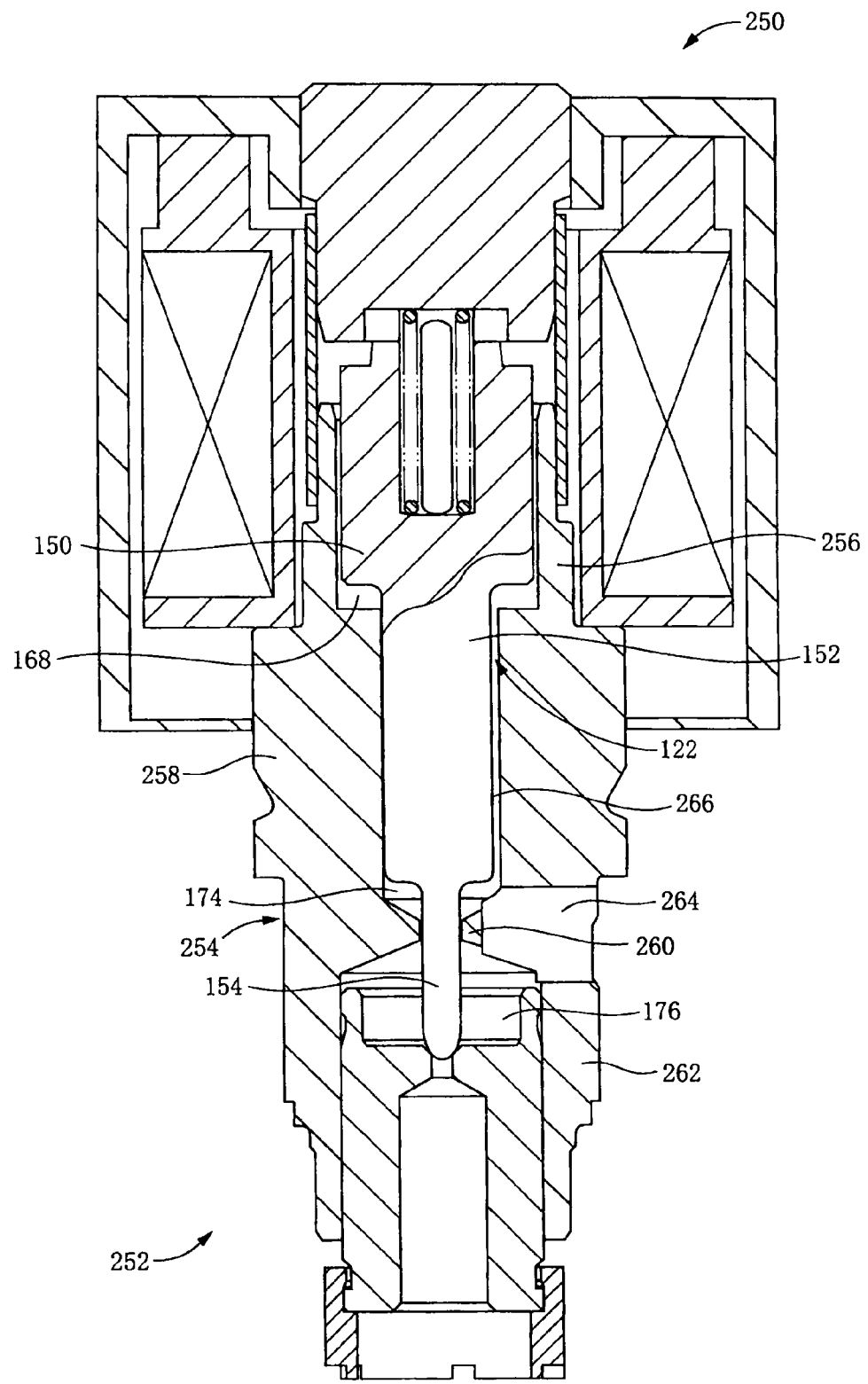
FIG. 8 is a schematic cross sectional view showing an electromagnetic linear valve constructed according to another modification of the embodiment.

FIG. 8 shows an electromagnetic linear valve 250 as another modification of the electromagnetic linear valve 80 of the above-described system 10. The electromagnetic linear valve 250 as the modification is substantially identical in construction with the electromagnetic linear valve 80 of the above-described system 10 except for a housing 252. Therefore, in the following description relating mainly to the housing 252, the same reference sings will be used to identify constructional elements having the same functions as those of the electromagnetic linear valve 80, and description of these elements will be omitted or simplified.

The housing 252 included in the electromagnetic linear valve 250 as the modification has a generally cylindrical-shaped wall member 254 constituting a wall surface of the housing 252. The wall member 254 is made of a ferromagnetic material, and is sectioned into a large inside-diameter portion 256, a small inside-diameter portion 258, a rod insertion portion 260 and a lower end portion 262. The large inside-diameter portion 256 is located in an upper end portion of the wall member 254. The small inside-diameter portion 258 is located on a lower side of the large inside-diameter portion 256, and has an inside diameter that is smaller than an inside diameter of the large inside-diameter portion 256. The rod insertion portion 260 has an inside diameter that is smaller than an inside diameter of the small inside-diameter portion 258. The lower end portion 262 is located in a lower end portion of the wall member 254. The wall member 254 has the same shape and size as those of a sub-assembly of the large cylindrical member 128 and the small cylindrical member 130 which are combined to each other and which are included in the above-described electromagnetic linear valve 80. The large outside-diameter portion 150, small outside-diameter portion 152 and rod portion 154 of the plunger 122 are inserted in the large inside-diameter portion 256, small inside-diameter portion 258 and rod insertion portion 260, respectively. Therefore, in the electromagnetic linear valve 250 as the modification, upon movement of the plunger 122 with the axis of the plunger 122 and the axis of the housing 252 being offset from each other, the small outside-diameter portion 152 and the small inside-diameter portion 258 are brought into contact with each other, without the large outside-diameter portion 150 and the large inside-diameter portion 256 being brought into contact with each other, and without the rod portion 154 and the rod insertion portion 260 being brought into contact with each other.

The wall member 254 is provided with a cutout portion 264 that serves as the rod-insertion-portion communication passage. The third plunger fluid chamber 174 and the fourth plunger fluid chamber 176 are held in communication with each other via the cutout portion 264. The cutout portion 264 has an opening which opens in an outer circumferential surface of the wall member 254 and which serves as the outlet port. For facilitating flow of the working fluid between the second plunger fluid chamber 168 and the third plunger fluid chamber 174, a flat portion 266 is provided on a part of the outer circumferential surface of the small outside-diameter portion 152 of the plunger 122 so as to extend in the axial direction.

Owing to the above-described construction, as well as in the electromagnetic linear valve 80 of the above-described system 10, in each of the electromagnetic linear valves 220, 250 as the two modifications, it is possible to reduce the friction force generated between the plunger and the inner wall surface of the housing and to maintain the self-vibration damping effect based on the electromotive force generated by the electromagnetic induction.

The invention claimed is:

1. An electromagnetic linear valve comprising:
  a housing having a dividing portion that divides an interior of said housing into a first fluid chamber and a second fluid chamber, said housing having a through-hole that passes through said dividing portion such that said first and second fluid chambers are to be in communication with each other via said through-hole, said interior of said housing being filled with a working fluid;
  a plunger movable in an axial direction thereof and located in said first fluid chamber in which said through-hole opens through an opening thereof, said plunger including a first end portion which serves as a valve body and which is seatable on said opening serving as a valve seat;
  an inlet port provided in said housing and being in communication with said second fluid chamber;
  an outlet port provided in said housing and being in communication with said first fluid chamber;
  an elastic body forcing said plunger in a forcing direction that causes said first end portion to be moved toward said opening; and
  a coil disposed to surround said housing and configured to form a magnetic field that causes said plunger to be moved in a direction that is opposite to the forcing direction,
  wherein said plunger has a stepped shape, and includes (a) a large outside-diameter portion which is made of a ferromagnetic material and which includes a second end portion constituted by another end portion of said plunger that is opposite to said first end portion of said plunger, and (b) a small outside-diameter portion which is made of a ferromagnetic material and which is contiguous to said large outside-diameter portion so as to be located on a side of said first end portion of said plunger,
  wherein said housing includes (c) a large inside-diameter portion which is made of a ferromagnetic material and in which said large outside-diameter portion is inserted with a clearance being defined between said large inside-diameter portion and said large outside-diameter portion, and (d) a small inside-diameter portion which is made of a ferromagnetic material and in which said small outside-diameter portion is inserted with a clearance being defined between said small inside-diameter portion and said small outside-diameter portion, said small inside-diameter portion being contiguous to said large inside-diameter portion, and wherein said clearance between said small inside-diameter portion and said small outside-diameter portion is smaller than said clearance between said large inside-diameter portion and said large outside-diameter portion.

2. The electromagnetic linear valve according to claim 1, being constructed such that, upon movement of said plunger within said housing, said small outside-diameter portion and said small inside-diameter portion are slidingly contactable with each other, without said large outside-diameter portion and said large inside-diameter portion being in sliding contact with each other.

3. The electromagnetic linear valve according to claim 1, wherein a ratio of an outside diameter of said small outside-diameter portion to an outside diameter of said large outside-diameter portion is not smaller than ½ and is not larger than ⅘.

4. The electromagnetic linear valve according to claim 1, wherein a ratio of said clearance between said small inside-diameter portion and said small outside-diameter portion to said clearance between said large inside-diameter portion and said large outside-diameter portion is not smaller than 1/10 and is not larger than ⅕.

5. The electromagnetic linear valve according to claim 1,
wherein said plunger includes a rod portion which is contiguous to said small outside-diameter portion and which is located on a side of said first end portion of said plunger, said plunger being formed of a single material piece that is made of a ferromagnetic material,
wherein said rod portion has an outside diameter smaller than an outside diameter of said small outside-diameter portion, and includes a rod end portion which serves as said valve body,
and wherein a surface of at least a portion of said plunger, which serves as said valve body, is constituted by a hardened surface subjected to a surface heat treatment for increasing a hardness of said surface.

6. The electromagnetic linear valve according to claim 1,
wherein said plunger includes a rod portion which is contiguous to said small outside-diameter portion and which is located on a side of said first end portion of said plunger,
wherein said rod portion has an outside diameter smaller than an outside diameter of said small outside-diameter portion, and includes a rod end portion which serves as said valve body,
wherein said first fluid chamber has:
(a) a large-outside-diameter-portion/small-inside-diameter-portion fluid chamber defined between shoulder surfaces, one of which interconnects an outer circumferential surface of said large outside-diameter portion and an outer circumferential surface of said small outside-diameter portion, and the other of which interconnects an inner circumferential surface of said large inside-diameter portion and an inner circumferential surface of said small inside-diameter portion; and
(b) a small-outside-diameter-portion/dividing-portion fluid chamber defined between said dividing portion and a shoulder surface that interconnects said outer circumferential surface of said small outside-diameter portion and an outer circumferential surface of said rod portion,
and wherein said small inside-diameter portion has, in addition to a communication passage constituted by said clearance between said small outside-diameter portion and said small inside-diameter portion, a small-inside-diameter-portion communication passage communicating between said large-outside-diameter-portion/small-inside-diameter-portion fluid chamber and said small-outside-diameter-portion/dividing-portion fluid chamber.

7. The electromagnetic linear valve according to claim 1,
wherein said plunger includes a rod portion which is contiguous to said small outside-diameter portion and which is located on a side of said first end portion of said plunger,
wherein said rod portion has an outside diameter smaller than an outside diameter of said small outside-diameter portion, and includes a rod end portion which serves as said valve body,
wherein said housing includes a rod insertion portion contiguous to one of opposite ends of said small inside-diameter portion which is remote from said large inside-diameter portion, such that said rod portion is inserted in said rod insertion portion with a clearance being defined between said rod portion and said rod insertion portion, said rod insertion portion having an inside diameter smaller than an inside diameter of said small inside-diameter portion,
and wherein said clearance between said small inside-diameter portion and said small outside-diameter portion is smaller than said clearance between said rod portion and said rod insertion portion.

8. The electromagnetic linear valve according to claim 7,
wherein said first fluid chamber has a small-outside-diameter-portion/dividing-portion fluid chamber defined between said dividing portion and a shoulder surface that interconnects an outer circumferential surface of said small outside-diameter portion and an outer circumferential surface of said rod portion,
wherein said small-outside-diameter-portion/dividing-portion fluid chamber has (a) a small-outside-diameter-portion/rod-insertion-portion fluid chamber defined between shoulder surfaces, one of which interconnects an outer circumferential surface of said small outside-diameter portion and an outer circumferential surface of said rod portion, and the other of which interconnects an inner circumferential surface of said small inside-diameter portion and an inner circumferential surface of said rod insertion portion, and (b) a rod-insertion-portion/dividing-portion fluid chamber defined between said rod insertion portion and said dividing portion,
wherein said rod insertion portion has, in addition to a communication passage constituted by said clearance between said rod portion and said rod insertion portion, a rod-insertion-portion communication passage communicating between said small-outside-diameter-portion/rod-insertion-portion fluid chamber and said rod-insertion-portion/dividing-portion fluid chamber,
wherein said rod-insertion-portion communication passage has an opening that opens to an outer circumferential surface of said housing,
and wherein said opening serves as said outlet port.

9. The electromagnetic linear valve according to claim 8,
wherein said first fluid chamber further has a large-outside-diameter-portion/small-inside-diameter-portion fluid chamber defined between shoulder surfaces, one of which interconnects an outer circumferential surface of said large outside-diameter portion and an outer circumferential surface of said small outside-diameter portion, and the other of which interconnects an inner circumferential surface of said large inside-diameter portion and an inner circumferential surface of said small inside-diameter portion, wherein said small inside-diameter portion has, in addition to a communication passage constituted by said clearance between said small outside-diameter portion and said small inside-diameter portion, a small-inside-diameter-portion communication passage communicating between said large-outside-diameter-portion/small-inside-diameter-portion fluid chamber and said small-outside-diameter-portion/dividing-portion fluid chamber, and wherein said small-inside-diameter-portion communication passage communicates between said large-outside-diameter-portion/small-inside-diameter-portion fluid chamber and said small-outside-diameter-portion/rod-insertion-portion fluid chamber of said small-outside-diameter-portion/dividing-portion fluid chamber.

10. The electromagnetic linear valve according to claim 1, wherein said housing includes (a) a large cylindrical member made of a ferromagnetic material and having an inside diameter that is larger than an outside diameter of said large outside-diameter portion, and (b) a small cylindrical member made of a ferromagnetic material and including a fitted portion that is fitted in said large cylindrical member, said fitted portion having an inside diameter that is larger than an outside diameter of said small outside-diameter portion and smaller than an outside diameter of said large outside-diameter portion, wherein said fitted portion of said small cylindrical member serves as said small inside-diameter portion, while a portion of said large cylindrical member, in which said fitted portion is not fitted, serves as said large inside-diameter portion, said electromagnetic linear valve being used while being attached to a base body, wherein said large cylindrical member has an annular groove at which said large cylindrical member is to be tightened by the base body when said electromagnetic linear valve is attached to the base body, said annular groove being provided in an outer circumferential surface of a portion of said large cylindrical member in which said fitted portion is fitted, and wherein said large cylindrical member and said fitted portion of said small cylindrical member cooperate with each other to define an annular space between an inner circumferential surface of said large cylindrical member and an outer circumferential surface of said fitted portion, such that said annular space is located in a same position as said annular groove in the axial direction.

11. The electromagnetic linear valve according to claim 1, wherein said plunger is movable in a direction which causes said first end portion of said plunger to be moved toward said opening of said through-hole and which is defined as said forcing direction, and is movable also in a direction which causes said first end portion of said plunger to be moved away from said opening of said through-hole and which is defined as a separating direction, wherein said housing includes a core portion which is made of a ferromagnetic material and which is constituted by a separating-direction-side end portion of said housing, said separating-direction-side end portion being a downstream end portion of said housing in the separating direction, said core portion being opposed to an end face of said second end portion of said plunger, and wherein said elastic body is disposed between said core portion and said large outside-diameter portion of said plunger, and generates an elastic force forcing said plunger in said forcing direction, said electromagnetic linear valve being constructed such that, upon formation of the magnetic field by said coil, a magnetic force is generated between said core portion and said large outside-diameter portion, and acts in a direction that causes said core portion and said large outside-diameter portion to be attracted toward each other.

12. The electromagnetic linear valve according to claim 11, comprising a cylindrical-shaped coil housing which is made of a ferromagnetic material and which is fixedly disposed on an outer circumferential surface of said housing such that said coil is surrounded by said coil housing, wherein a separating-direction-side end portion of said coil housing, which is a downstream end portion of said coil housing in the separating direction, is located on a downstream side, in the separating direction, of an end face of an end portion of said core portion, which is located on a side of said first end portion of said plunger, and wherein a forcing-direction-side end portion of said coil housing, which is a downstream end portion of said coil housing in the forcing direction, is located on a downstream side, in the forcing direction, of a shoulder surface interconnecting an inner circumferential surface of said large inside-diameter portion and an inner circumferential surface of said small inside-diameter portion.

13. An electromagnetic linear valve comprising:

a housing having a dividing portion that divides an interior of said housing into a first fluid chamber and a second fluid chamber, said housing having a through-hole that passes through said dividing portion such that said first and second fluid chambers are to be in communication with each other via said through-hole, said interior of said housing being filled with a working fluid;

a plunger movable in an axial direction thereof and located in said first fluid chamber in which said through-hole opens through an opening thereof, said plunger including a first end portion which serves as a valve body and which is seatable on said opening serving as a valve seat;

an inlet port provided in said housing and being in communication with said second fluid chamber;

an outlet port provided in said housing and being in communication with said first fluid chamber;

an elastic body forcing said plunger in a forcing direction that causes said first end portion to be moved toward said opening; and a coil disposed to surround said housing and configured to form a magnetic field that causes said plunger to be moved in a direction that is opposite to the forcing direction, wherein said plunger has two flux-passing portions which are contiguous to each other in the axial direction, such that a magnetic flux is caused to flow in the axial direction upon formation of a magnetic field by said coil, and wherein one of said two flux-passing portions is (a) a first flux-passing portion including an end portion that is constituted by a second end portion of said plunger, while the other of said two flux-passing portions is (b) a second flux-passing portion that is located on a side of said first end portion of said plunger, such that the magnetic flux can be caused to flow by a larger amount within said first flux-passing portion than within said second flux-passing portion, said electromagnetic linear valve being constructed such that, upon movement of said plunger within said housing, said second flux-passing portion and said housing are slidingly contactable with each other, while said first flux-passing portion and said housing are spaced apart from each other by a clearance defined therebetween without said first flux-passing portion and said housing being in sliding contact with each other, said clearance defined between said first flux-passing portion and said housing being larger than a clearance defined between said second flux-passing portion and said housing, and said electromagnetic linear valve being constructed such that, upon flow of the magnetic flux through said first and second flux-passing portions, a part of the magnetic flux, which is disabled to flow to said second flux-passing portion as a result of magnetic saturation of said second flux-passing portion, is caused to flow between said first flux-passing portion and said housing via said clearance defined therebetween, while a part of the magnetic flux, which is allowed to flow to said second flux-passing portion, is caused to flow between said second flux-passing portion and said housing.

* * * * *